United States Patent
Elston et al.

(10) Patent No.: US 9,908,527 B2
(45) Date of Patent: Mar. 6, 2018

(54) MULTIPLE ZONE SENSING FOR MATERIALS HANDLING VEHICLES

(71) Applicant: Crown Equipment Corporation, New Bremen, OH (US)

(72) Inventors: Edwin R. Elston, Valparaiso, FL (US); Vernon W. Siefring, Covington, OH (US); Eric L. Jensen, Fort Myers, FL (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 15/455,571

(22) Filed: Mar. 10, 2017

(65) Prior Publication Data

US 2017/0183005 A1    Jun. 29, 2017

Related U.S. Application Data

(60) Division of application No. 12/631,007, filed on Dec. 4, 2009, now Pat. No. 9,645,968, which is a
(Continued)

(51) Int. Cl.
*B60W 30/09* (2012.01)
*B60W 10/04* (2006.01)
(Continued)

(52) U.S. Cl.
CPC ............ *B60W 30/09* (2013.01); *B60W 10/04* (2013.01); *B60W 10/20* (2013.01); *B60W 50/08* (2013.01);
(Continued)

(58) Field of Classification Search
None
See application file for complete search history.

(56) References Cited

U.S. PATENT DOCUMENTS

| 1,835,808 A | 12/1931 | Pitts |
| 2,959,260 A | 11/1960 | Johnson et al. |

(Continued)

FOREIGN PATENT DOCUMENTS

| DE | 10033857 | 1/2002 |
| EP | 1462880 A2 | 9/2004 |

(Continued)

OTHER PUBLICATIONS

Masashi Honda; International Preliminary Report on Patentability and Written Opinion of the International Searching Authority; International Application No. PCT/US2007/078455; dated Mar. 17, 2009; International Bureau of WIPO; Geneva, Switzerland.

(Continued)

*Primary Examiner* — Rami Khatib
(74) *Attorney, Agent, or Firm* — Stevens & Showalter, LLP

(57) ABSTRACT

A materials handling vehicle includes at least one contactless obstacle sensor that scans at least two speed zones, each speed zone being defined in an area at least partially in front of a forward traveling direction of the vehicle and being associated with a unique predetermined maximum speed greater than zero (0) miles per hour. A controller that receives information obtained from the at least one obstacle sensor and, if the vehicle is traveling under remote control, the controller is configured to limit the vehicle speed to the predetermined maximum speed of a corresponding one of the at least two speed zones based upon the detection of an obstacle in that speed zone.

36 Claims, 12 Drawing Sheets

Related U.S. Application Data continuation-in-part of application No. 11/855,310, filed on Sep. 14, 2007, now Pat. No. 9,082,293, and a continuation-in-part of application No. 11/855,324, filed on Sep. 14, 2007, now Pat. No. 8,072,309.

(60) Provisional application No. 61/119,952, filed on Dec. 4, 2008, provisional application No. 61/222,632, filed on Jul. 2, 2009, provisional application No. 61/234,866, filed on Aug. 18, 2009, provisional application No. 60/825,688, filed on Sep. 14, 2006.

(51) Int. Cl.
  B60W 10/20  (2006.01)
  B60W 50/08  (2012.01)
  B66F 9/075  (2006.01)
  G05D 1/00  (2006.01)
  G05D 1/02  (2006.01)

(52) U.S. Cl.
  CPC ...... *B66F 9/07509* (2013.01); *B66F 9/07568* (2013.01); *B66F 9/07572* (2013.01); *B66F 9/07581* (2013.01); *G05D 1/0011* (2013.01); *G05D 1/021* (2013.01); *B60W 2300/121* (2013.01); *B60W 2540/04* (2013.01); *B60W 2550/10* (2013.01); *B60W 2710/20* (2013.01); *B60W 2720/10* (2013.01)

(56) References Cited

U.S. PATENT DOCUMENTS

| | | | |
|---|---|---|---|
| 3,016,973 A | 1/1962 | Williamson | |
| 3,047,783 A | 7/1962 | Van Oort et al. | |
| 3,587,784 A | 6/1971 | Tait | |
| 3,825,130 A | 7/1974 | Lapham | |
| 3,968,893 A | 7/1976 | Lapham | |
| 4,074,120 A | 2/1978 | Allred et al. | |
| 4,252,495 A | 2/1981 | Cook | |
| 4,258,825 A | 3/1981 | Collins | |
| 4,287,966 A | 9/1981 | Frees | |
| 4,384,695 A * | 5/1983 | Nohmi | B61L 3/008 246/182 B |
| 4,476,954 A | 10/1984 | Johnson et al. | |
| 4,527,651 A | 7/1985 | Thiermann, Sr. | |
| 4,546,840 A | 10/1985 | Yukishige et al. | |
| 4,551,059 A | 11/1985 | Petoia | |
| 4,644,237 A * | 2/1987 | Frushour | B25J 9/1676 318/582 |
| 4,665,487 A * | 5/1987 | Ogawa | G05D 1/0265 180/168 |
| 4,714,140 A | 12/1987 | Hatton et al. | |
| 4,716,980 A | 1/1988 | Butler | |
| 4,785,664 A | 11/1988 | Reebs | |
| 4,954,817 A | 9/1990 | Levine | |
| 5,023,790 A | 6/1991 | Luke, Jr. | |
| 5,036,935 A | 8/1991 | Kohara | |
| 5,044,472 A | 9/1991 | Dammeyer et al. | |
| 5,107,946 A | 4/1992 | Kamimura et al. | |
| 5,141,381 A | 8/1992 | Kato et al. | |
| 5,170,351 A | 12/1992 | Nemoto et al. | |
| 5,245,144 A | 9/1993 | Stammen | |
| 5,307,271 A | 4/1994 | Everett, Jr. et al. | |
| 5,502,638 A | 3/1996 | Takenaka | |
| 5,652,486 A | 7/1997 | Mueller et al. | |
| 5,709,523 A | 1/1998 | Ware | |
| 5,816,741 A | 10/1998 | Troppman, III | |
| 5,892,855 A | 4/1999 | Kakinami et al. | |
| 5,913,919 A | 6/1999 | Bauer et al. | |
| 5,928,292 A | 7/1999 | Miller et al. | |
| 5,938,710 A * | 8/1999 | Lanza | B66F 9/063 180/169 |
| 5,939,986 A * | 8/1999 | Schiffbauer | B66C 15/045 299/12 |
| 5,964,313 A | 10/1999 | Guy | |
| 6,030,169 A | 2/2000 | Rossow et al. | |
| 6,157,892 A | 12/2000 | Hada et al. | |
| 6,173,215 B1 * | 1/2001 | Sarangapani | B60K 31/0008 700/250 |
| 6,276,485 B1 | 8/2001 | Eriksson et al. | |
| 6,285,925 B1 | 9/2001 | Steffen | |
| 6,382,359 B1 | 5/2002 | Lohmann | |
| 6,464,025 B1 | 10/2002 | Koeper et al. | |
| 6,548,982 B1 | 4/2003 | Papanikolopoulos et al. | |
| 6,595,306 B2 | 7/2003 | Trego et al. | |
| 6,686,951 B1 | 2/2004 | Dickson et al. | |
| 6,748,292 B2 | 6/2004 | Mountz | |
| 6,784,800 B2 * | 8/2004 | Orzechowski | B66F 9/0755 340/539.1 |
| 6,809,680 B2 | 10/2004 | Tojima | |
| 6,810,319 B2 | 10/2004 | Manaka | |
| 7,017,689 B2 | 3/2006 | Gilliland et al. | |
| 7,076,366 B2 | 7/2006 | Simon et al. | |
| 7,099,764 B2 * | 8/2006 | Seto | B60T 7/22 303/193 |
| 7,266,477 B2 * | 9/2007 | Foessel | G01S 13/723 340/436 |
| 7,610,121 B2 | 10/2009 | Nishira et al. | |
| 7,711,464 B2 | 5/2010 | Kaufmann | |
| 7,734,419 B2 | 6/2010 | Konsoh | |
| 7,765,066 B2 | 7/2010 | Braeuchle et al. | |
| 7,860,653 B2 | 12/2010 | Joe et al. | |
| 8,027,029 B2 | 9/2011 | Lu et al. | |
| 8,060,400 B2 | 11/2011 | Wellman | |
| 8,072,309 B2 | 12/2011 | Kraimer et al. | |
| 8,170,787 B2 | 5/2012 | Coats et al. | |
| 8,180,561 B2 | 5/2012 | Osanai | |
| 8,386,146 B2 | 2/2013 | Shirai | |
| 8,452,464 B2 | 5/2013 | Castaneda et al. | |
| 9,082,293 B2 | 7/2015 | Wellman et al. | |
| 9,207,673 B2 | 12/2015 | Pulskamp et al. | |
| 2001/0035729 A1 | 11/2001 | Graiger et al. | |
| 2002/0163495 A1 | 11/2002 | Doynov | |
| 2002/0178830 A1 | 12/2002 | Kazerooni et al. | |
| 2003/0014162 A1 | 1/2003 | Sadano | |
| 2003/0029648 A1 | 2/2003 | Trego et al. | |
| 2003/0205433 A1 | 11/2003 | Hagman | |
| 2003/0216854 A1 | 11/2003 | Katakura et al. | |
| 2004/0193363 A1 * | 9/2004 | Schmidt | A01B 69/007 701/23 |
| 2004/0193374 A1 | 9/2004 | Hac et al. | |
| 2005/0052412 A1 | 3/2005 | McRae et al. | |
| 2005/0073433 A1 * | 4/2005 | Gunderson | B60Q 9/006 340/903 |
| 2005/0216124 A1 | 9/2005 | Suzuki | |
| 2005/0244259 A1 | 11/2005 | Chilson et al. | |
| 2006/0125806 A1 | 6/2006 | Voyles et al. | |
| 2006/0238156 A1 | 10/2006 | Kim | |
| 2006/0250255 A1 | 11/2006 | Flanagan | |
| 2007/0016341 A1 * | 1/2007 | Nagasawa | B60T 7/18 701/1 |
| 2007/0056157 A1 * | 3/2007 | Hirata | B23K 3/087 29/593 |
| 2007/0088477 A1 | 4/2007 | Brewer et al. | |
| 2008/0071429 A1 | 3/2008 | Kraimer et al. | |
| 2008/0129445 A1 | 6/2008 | Kraimer et al. | |
| 2008/0189005 A1 | 8/2008 | Chilson et al. | |
| 2008/0202243 A1 * | 8/2008 | Gross | G01S 15/08 73/627 |
| 2009/0076664 A1 | 3/2009 | McCabe et al. | |
| 2010/0114405 A1 | 5/2010 | Elston et al. | |
| 2011/0018699 A1 | 1/2011 | Chen et al. | |
| 2011/0035086 A1 | 2/2011 | Kim et al. | |

FOREIGN PATENT DOCUMENTS

| | | |
|---|---|---|
| EP | 2036763 A2 | 3/2009 |
| FR | 2764091 A1 | 12/1998 |
| GB | 1002825 | 9/1965 |
| GB | 2197799 A | 6/1988 |
| GB | 2360500 | 9/2001 |
| JP | 2152898 | 6/1990 |

(56) References Cited

FOREIGN PATENT DOCUMENTS

| | | |
|---|---|---|
| JP | 2002104800 | 4/2002 |
| JP | 2005094425 A | 4/2005 |
| WO | 199215977 | 9/1992 |
| WO | 3639679 A1 | 12/1996 |
| WO | 2004057553 | 7/2004 |
| WO | 2008039649 A2 | 4/2008 |
| WO | 2010065864 A2 | 6/2010 |
| WO | 2011002478 A2 | 1/2011 |
| WO | 2011022026 | 2/2011 |

OTHER PUBLICATIONS

Gregory Garcia; B.O.S.S. A Battery Operated Smart Servant; EEL 5666c; Intelligent Machines Design Lab; Sensor Presentation; Center for Intelligent Machines and Robotics; University of Florida; Aug. 17, 2006.

Weber et al.; "Ein tragbares Funk-Fernsteuergerat fur Gewinnungsmaschinen"; Gluckauf, Minova Carbo Tech GmbH; Apr. 13, 1967; pp. 375-378; XP002093388; ISSN; 0340-7896; Essen, DE.

Khatib, Rami; Advisory Action; U.S. Appl. No. 12/631,007; dated Feb. 14, 2014; U.S. Patent and Trademark Office; Alexandria, VA.

Khatib, Rami; Advisory Action; U.S. Appl. No. 12/631,007; dated Feb. 26, 2014; U.S. Patent and Trademark Office; Alexandria, VA.

Khatib, Rami; Notice of Allowance; U.S. Appl. No. 12/631,007; dated Jan. 18, 2017; U.S. Patent and Trademark Office; Alexandria, VA.

Khatib, Rami; Final Office Action; U.S. Appl. No. 12/631,007; dated Nov. 22, 2013; U.S. Patent and Trademark Office; Alexandria, VA.

Emery, Carole; Invitation to Pay Additional Fees and Partial International Search; International Application No. PCT/US2007/078455; dated Sep. 3, 2008; European Patent Office, Munich, Germany.

Pham, Phong; International Search Report and Written Opinion of the International Searching Authority; International Application No. PCT/US2007/078455; dated Dec. 29, 2008; European Patent Office, Munich, Germany.

Khatib, Rami; Non-final Office Action; U.S. Appl. No. 12/631,007; dated Nov. 30, 2012; U.S. Patent and Trademark Office; Alexandria, VA.

Decision on Appeal; U.S. Appl. No. 12/631,007; dated Dec. 30, 2016; U.S. Patent and Trademark Office; Alexandria, VA.

Khatib, Rami; Non-final Office Action; U.S. Appl. No. 13/738,016; dated Jul. 17, 2013; U.S. Patent and Trademark Office; Alexandria, VA.

Jordan Fei; Non-final Office Action; U.S. Appl. No. 12/649,738; dated Aug. 1, 2013; U.S. Patent and Trademark Office; Alexandria, VA.

Redhwan K. Mawari; Office Action-Final Rejection; U.S. Appl. No. 11/855,310; dated Sep. 1, 2010; U.S. Patent and Trademark Office; Alexandria, VA.

Lalinde, Rafael; International Search Report and Written Opinion of the International Searching Authority; International Application No. PCT/US2009/066789; dated Dec. 16, 2010; European Patent Office, Munich, Germany.

Lalinde, Rafael; International Search Report and Written Opinion of the International Searching Authority; International Application No. PCT/US2009/069833; dated Dec. 2, 2010; European Patent Office; Munich, Germany.

Bourdon, G. et al.; Instataneous Fuzzy Modelling for Obstacle Avoidance; Systems, Man and Cybernetics; Intelligent Systems for the 21st Century; IEEE International Conference; vol. 3; Oct. 22, 1995; pp. 2546-2551; New York, NY.

Kovacs, S. et al.; Interpolation-based Fuzzy Logic Controller, as a Simplified Way for Constructing the Fuzzy Rulebase of the Path Tracking and Collision Avoidance Strategy of an AGV; Systems, Man and Cybernetics; IEEE International Conference; vol. 2; Oct. 11, 1998; pp. 1317-1322; New York, NY.

Lalinde, Rafael; International Search Report and Written Opinion of the International Searching Authority; International Application No. PCT/US2009/069839; dated Mar. 16, 2011; European Patent Office; Munich, Germany.

http://www.cajunbot.com/technology; 2011; CajunBot Labs.

http://www.cajunbot.com; 2011; CajunBot Labs.

Urban Challenge; http://www.darpa.mil/grandchallenge/index.asp; Nov. 3, 2007.

CajunBot Wiki; http:cajunbot.com/wiki/Main_Page; Apr. 18, 2010.

Urban Challenge; http://www.darpa.mil/grandchallenge/resources.asp.

Vano Gea, Joaquin; International Search Report and Written Opinion of the International Searching Authority; International Application No. PCT/US2012/022011; dated Jun. 20, 2012; European Patent Office; Munich, Germany.

Pitard, Jacqueline; Invitation to Pay Additional Fees and Communication Relating to the Results of the Partial International Search; International Application No. PCT/US2012/025849; dated Jul. 16, 2012; European Patent Office; Munich, Germany.

Desyllas, Dimitri; International Search Report and Written Opinion; International Application No. PCT/US2012/025849; dated Sep. 12, 2012; European Patent Office; Munich, Germany.

To, Tuan; Non-final Office Action; U.S. Appl. No. 12/649,815; dated Aug. 29, 2012; U.S. Patent and Trademark Office; Alexandria, VA.

To, Tuan; Final Office Action; U.S. Appl. No. 12/649,815; dated Dec. 13, 2012; U.S. Patent and Trademark Office; Alexandria, VA.

Rami Khatib; Non-final Office Action; U.S. Appl. No. 13/738,097; dated Jul. 18, 2013; U.S. Patent and Trademark Office; Alexandria, VA.

Lalinde, Rafael; Office Action; European Application No. 09807478.4; dated Aug. 2, 2013; European Patent Office; Munich, Germany.

Chinese Office Action; Application No. 200980148469.7; dated Jan. 5, 2013; Chinese Patent Office.

* cited by examiner

MULTIPLE ZONE SENSING FOR MATERIALS HANDLING VEHICLES

CROSS REFERENCE TO RELATED APPLICATIONS

This application is a divisional of U.S. patent application Ser. No. 12/631,007, filed Dec. 4, 2009, entitled "MULTIPLE ZONE SENSING FOR MATERIALS HANDLING VEHICLES," which claims the benefit of each of U.S. Provisional Patent Application Ser. No. 61/119,952, filed Dec. 4, 2008, entitled "MULTIPLE ZONE SENSING FOR REMOTELY CONTROLLED MATERIALS HANDLING VEHICLE;" U.S. Provisional Patent Application Ser. No. 61/222,632, filed Jul. 2, 2009, entitled "APPARATUS FOR REMOTELY CONTROLLING A MATERIALS HANDLING VEHICLE;" and U.S. Provisional Patent Application Ser. No. 61/234,866, filed Aug. 18, 2009, entitled "STEER CORRECTION FOR A REMOTELY OPERATED MATERIALS HANDLING VEHICLE;" the entire disclosures of each of which are hereby incorporated by reference herein. U.S. patent application Ser. No. 12/631,007 is a Continuation-In-Part of U.S. patent application Ser. No. 11/855,310, filed Sep. 14, 2007, entitled "SYSTEMS AND METHODS OF REMOTELY CONTROLLING A MATERIALS HANDLING VEHICLE"(now U.S. Pat. No. 9,082,293); and U.S. patent application Ser. No. 11/855,324, filed Sep. 14, 2007, entitled "SYSTEMS AND METHODS OF REMOTELY CONTROLLING A MATERIALS HANDLING VEHICLE" (now U.S. Pat. No. 8,072,309); the entireties of both of which are hereby incorporated by reference herein and both of which claim the benefit of U.S. Provisional Patent Application Ser. No. 60/825,688, filed Sep. 14, 2006, entitled "SYSTEMS AND METHODS OF REMOTELY CONTROLLING A MATERIALS HANDLING VEHICLE." U.S. patent application Ser. No. 12/631,007 is related to International Application No. PCT/US09/66789, filed Dec. 4, 2009, entitled "MULTIPLE ZONE SENSING FOR MATERIALS HANDLING VEHICLES," the entire disclosure of which is hereby incorporated by reference herein. This application is related to U.S. Pat. Nos. 8,725,362, 8,725,317, and 8,725,363, which were each filed on Jan. 10, 2013, are respectively entitled "MULTIPLE ZONE SENSING FOR MATERIALS HANDLING VEHICLES TRAVELING UNDER REMOTE CONTROL", "MULTIPLE DETECTION ZONE SUPPLEMENTAL REMOTE CONTROL SYSTEM FOR A MATERIALS HANDLING VEHICLE", and "METHOD FOR OPERATING A MATERIALS HANDLING VEHICLE UTILIZING MULTIPLE DETECTION ZONES" U.S. patent application Ser. Nos. 13/738,016, 13/738,060 and 13/738,097, and are siblings of the present application as each being children of U.S. patent application Ser. No. 12/631,007.

BACKGROUND OF THE INVENTION

The present invention relates in general to materials handling vehicles, and more particularly, to systems and methods that integrate detection zone information into supplemental wireless remote control arrangements for materials handling vehicles.

Low level order picking trucks are commonly used for picking stock in warehouses and distribution centers. Such order picking trucks typically include load carrying forks and a power unit having a platform upon which an operator may step and ride while controlling the truck. The power unit also has a steerable wheel and corresponding traction and steering control mechanisms, e.g., a movable steering arm that is coupled to the steerable wheel. A control handle attached to the steering arm typically includes the operational controls necessary for driving the truck and operating its load handling features.

In a typical stock picking operation, an operator fills orders from available stock items that are located in storage areas provided along a plurality of aisles of a warehouse or distribution center. In this regard, the operator drives a low lever order picking truck to a first location where item(s) are to be picked. In a pick process, the operator typically steps off the truck, walks over to the appropriate location and retrieves the ordered stock item(s) from their associated storage area(s). The operator then places the picked stock on a pallet, collection cage or other support structure carried by the forks of the order picking truck. Upon completing the pick process, the operator advances the order picking truck to the next location where item(s) are to be picked. The above process is repeated until all stock items on the order have been picked.

It is not uncommon for an operator to repeat the pick process several hundred times per order. Moreover, the operator may be required to pick numerous orders per shift. As such, the operator may be required to spend a considerable amount of time relocating and repositioning the order picking truck, which reduces the time available for the operator to spend picking stock.

BRIEF SUMMARY OF THE INVENTION

According to various aspects of the present invention, a materials handling vehicle having detection zone control comprises a power unit for driving the vehicle, a load handling assembly that extends from the power unit, at least one contactless obstacle sensor on the vehicle and a controller. The obstacle sensor(s) are operable to define at least two detection zones, each detection zone defining an area at least partially in front of a forward traveling direction of the vehicle. Moreover, the controller is configured to control at least one aspect of the vehicle and is further configured to receive information obtained from the obstacle sensor(s) and to perform a first action if the vehicle is traveling and an obstacle is detected in a first one of the detection zones; and to perform a second action different from the first action if the vehicle is traveling and an obstacle is detected in a second one of the detection zones.

According to still further aspects of the present invention, a multiple detection zone control system for a materials handling vehicle comprises at least one contactless obstacle sensor and a controller. The obstacle sensor(s) are operable to define at least two detection zones, each detection zone defining an area at least partially in front of a forward traveling direction of the vehicle when the vehicle is traveling. The controller is configured to integrate with and control at least one aspect of the vehicle. Additionally, the controller is further configured to receive information obtained from the obstacle sensor(s) to perform a first action if the vehicle is traveling and an obstacle is detected in a first one of the detection zones and perform a second action different from the first action if the vehicle is traveling and an obstacle is detected in a second one of the detection zones.

According to various further aspects of the present invention, a materials handling vehicle capable of supplemental remote control may include detection zone control. The materials handling vehicle comprises a power unit for driving the vehicle, a load handling assembly that extends from the power unit and a receiver at the vehicle for receiving transmissions from a corresponding remote control device. The transmissions from the remote control device to the receiver include at least a first type signal designating a travel request, which requests the vehicle to travel by a predetermined amount. The vehicle also includes at least one contactless obstacle sensor on the vehicle that is operable to define at least two detection zones, each detection zone defining an area at least partially in front of a forward traveling direction of the vehicle when the vehicle is traveling under remote control in response to a travel request.

Still further, the vehicle includes a controller that communicates with the receiver and with a traction control system of the vehicle to operate the vehicle under remote control in response to receiving travel requests from the remote control device. The controller is configured to perform a first action if the vehicle is traveling under remote control in response to a travel request and an obstacle is detected in a first one of the detection zones and the controller is configured to perform a second action different from the first action if the vehicle is traveling under remote control in response to a travel request and an obstacle is detected in a second one of the detection zones.

According to still further aspects of the present invention, systems and methods are provided to implement a multiple detection zone supplemental remote control system, e.g., which can be installed on a materials handling vehicle. The multiple detection zone supplemental remote control system comprises a remote control device manually operable by an operator to wirelessly transmit at least a first type signal designating a travel request, which requests the vehicle to travel by a predetermined amount. The system also includes a receiver for installation on the vehicle that receives transmissions from the corresponding remote control device. Still further, the system includes at least one contactless obstacle sensor that is operable to define at least two detection zones, each detection zone defining an area at least partially in front of a forward traveling direction of the vehicle when the vehicle is traveling under remote control in response to a travel request.

The system also includes a controller that communicates with the receiver and with a traction control system of the vehicle to operate the vehicle under remote control in response to receiving travel requests from the remote control device. The controller is configured to perform a first action if the vehicle is traveling under remote control in response to a travel request and an obstacle is detected in a first one of the detection zones and the controller is configured to perform a second action different from the first action if the vehicle is traveling under remote control in response to a travel request and an obstacle is detected in a second one of the detection zones.

Still further, a method is provided for operating a materials handling vehicle utilizing multiple detection zones. First and second detection zones are defined in areas proximate to the vehicle. A first action is performed if an unacceptable detection occurs in the first detection zone, and a second action is performed different from the first action if an unacceptable detection occurs in the second detection zone.

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Figure 1:
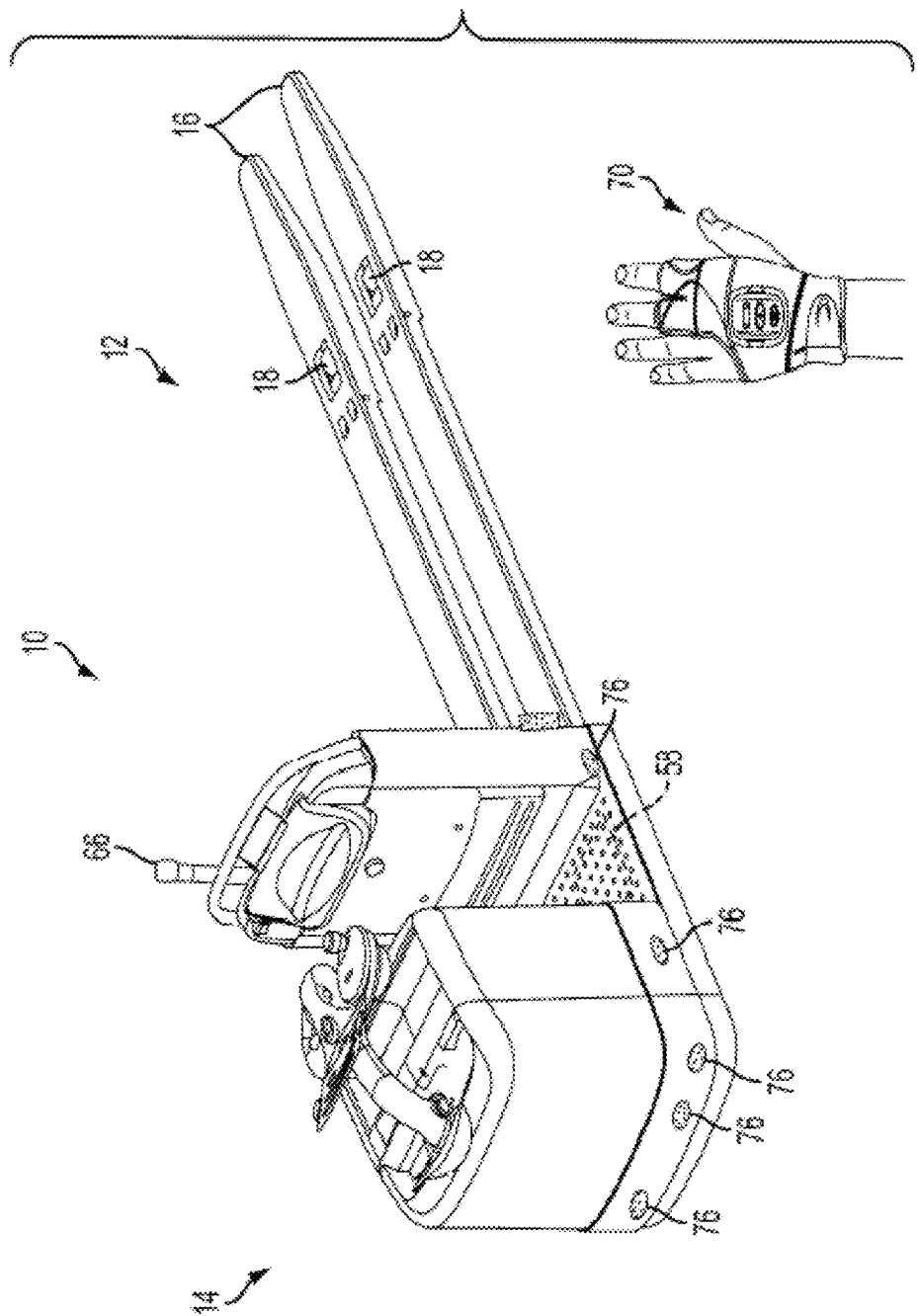
FIG. 1 is an illustration of a materials handling vehicle capable of supplemental remote control according to various aspects of the present invention.

Low Level Order Picking Truck:

Referring now to the drawings, and particularly to FIG. 1, a materials handling vehicle, which is illustrated as a low level order picking truck 10, includes in general a load handling assembly 12 that extends from a power unit 14. The load handling assembly 12 includes a pair of forks 16, each fork 16 having a load supporting wheel assembly 18. The load handling assembly 12 may include other load handling features in addition to, or in lieu of the illustrated arrangement of the forks 16, such as a load backrest, scissors-type elevating forks, outriggers or separate height adjustable forks. Still further, the load handling assembly 12 may include load handling features such as a mast, a load platform, collection cage or other support structure carried by the forks 16 or otherwise provided for handling a load supported and carried by the truck 10.

The illustrated power unit 14 comprises a step-through operator's station dividing a first end section of the power unit 14 (opposite the forks 16) from a second end section (proximate the forks 16). The step-through operator's station provides a platform upon which an operator may stand to drive the truck 10. The platform also provides a position from which the operator may operate the load handling features of the truck 10. Presence sensors 58 may be provided, e.g., on, above, or under the platform floor of the operator's station. Still further, presence sensors 58 may be otherwise provided about the operator's station to detect the presence of an operator on the truck 10. In the exemplary truck of FIG. 1, the presence sensors 58 are shown in dashed lines indicating that they are positioned under the platform floor. Under this arrangement, the presence sensors 58 may comprise load sensors, switches, etc. As an alternative, the presence sensors 58 may be implemented above the platform 56, such as by using ultrasonic, capacitive or other suitable sensing technology.

An antenna 66 extends vertically from the power unit 14 and is provided for receiving control signals from a corresponding remote control device 70. The remote control device 70 may comprise a transmitter that is worn or otherwise maintained by the operator. As an example, the remote control device 70 may be manually operable by an operator, e.g., by pressing a button or other control, to cause the device 70 to wirelessly transmit at least a first type signal designating a travel request to the vehicle, thus requesting the vehicle to travel by a predetermined amount.

The truck 10 also comprises one or more obstacle sensors 76, which are provided about the vehicle, e.g., towards the first end section of the power unit 14 and/or to the sides of the power unit 14. The obstacle sensors 76 include at least one contactless obstacle sensor on the vehicle, and are operable to define at least two detection zones, each detection zone defining an area at least partially in front of a forward traveling direction of the vehicle when the vehicle is traveling under remote control in response to a travel request as will be described in greater detail herein. The obstacle sensors 76 may comprise any suitable proximity detection technology, such as ultrasonic sensors, optical recognition devices, infrared sensors, laser sensors, etc., which are capable of detecting the presence of objects/obstacles within the predefined detection zones of the power unit 14.

In practice, the truck 10 may be implemented in other formats, styles and features, such as an end control pallet truck that includes a steering tiller arm that is coupled to a tiller handle for steering the truck. In this regard, the truck 10 may have similar or alternative control arrangements to that shown in FIG. 1. Still further, the truck 10, supplemental remote control system and/or components thereof, may comprise any additional and/or alternative features, such as set out in U.S. Provisional Patent Application Ser. No. 60/825,688, filed Sep. 14, 2006 entitled "SYSTEMS AND METHODS OF REMOTELY CONTROLLING A MATERIALS HANDLING VEHICLE", U.S. patent application Ser. No. 11/855,310, entitled "SYSTEMS AND METHODS OF REMOTELY CONTROLLING A MATERIALS HANDLING VEHICLE", U.S. patent application Ser. No. 11/855,324, entitled "SYSTEMS AND METHODS OF REMOTELY CONTROLLING A MATERIALS HANDLING VEHICLE", U.S. Provisional Patent Application Ser. No. 61/222,632, filed Jul. 2, 2009 entitled "APPARATUS FOR REMOTELY CONTROLLING A MATERIALS HANDLING VEHICLE," and U.S. Provisional Patent Application Ser. No. 61/234,866, filed Aug. 18, 2009 entitled "STEER CORRECTION FOR A REMOTELY OPERATED MATERIALS HANDLING VEHICLE".

Figure 2:
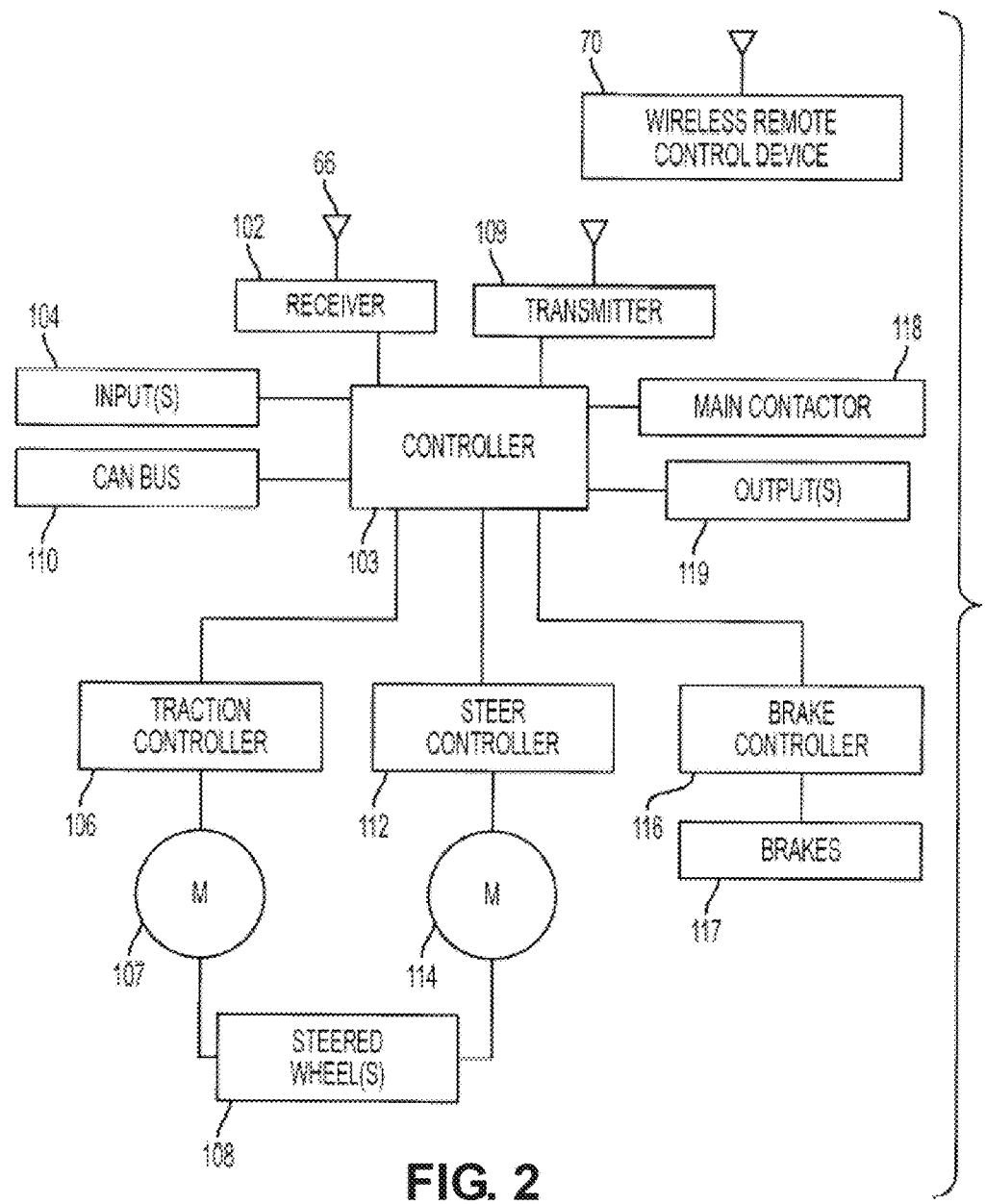
FIG. 2 is a schematic diagram of several components of a materials handling vehicle capable of supplemental remote control according to various aspects of the present invention.

Control System for Remote Control of a Low Level Order Picking Truck:

Referring to FIG. 2, a block diagram 100 illustrates a control arrangement for integrating remote control commands with the truck 10. The antenna 66 is coupled to a receiver 102 for receiving commands issued by the remote control device 70. The receiver 102 passes the received control signals to a controller 103, which implements the appropriate response to the received commands. The response may comprise one or more actions, or inaction, depending upon the logic that is being implemented. Positive actions may comprise controlling, adjusting or otherwise affecting one or more components of the truck 10. The controller 103 may also receive information from other inputs 104, e.g., from sources such as the presence sensors 58, the obstacle sensors 76, switches, encoders and other devices/features available to the truck 10 to determine appropriate action in response to the received commands from the remote control device 70. The sensors 58, 76, etc. may be coupled to the controller 103 via the inputs 104 or via a suitable truck network, such as a control area network (CAN) bus 110.

In an exemplary arrangement, the remote control device 70 is operative to wirelessly transmit a control signal that represents a first type signal such as a travel command to the receiver 102 on the truck 10. The travel command is also referred to herein as a "travel signal", "travel request" or "go signal". The travel request is used to initiate a request to the truck 10 to travel by a predetermined amount, e.g., to cause the truck 10 to advance or jog in a first direction by a limited travel distance. The first direction may be defined, for example, by movement of the truck 10 in a power unit 14 first, i.e., forks 16 to the back, direction. However, other directions of travel may alternatively be defined. Moreover, the truck 10 may be controlled to travel in a generally straight direction or along a previously determined heading. Correspondingly, the limited travel distance may be specified by an approximate travel distance, travel time or other measure.

Thus, a first type signal received by the receiver 102 is communicated to the controller 103. If the controller 103 determines that the travel signal is a valid travel signal and that the current vehicle conditions are appropriate (explained in greater detail below), the controller 103 sends a signal to the appropriate control configuration of the particular truck 10 to advance and then stop the truck 10. As will be described in greater detail herein, stopping the truck 10 may be implemented, for example, by either allowing the truck 10 to coast to a stop or by applying a brake to stop the truck.

As an example, the controller 103 may be communicably coupled to a traction control system, illustrated as a traction motor controller 106 of the truck 10. The traction motor controller 106 is coupled to a traction motor 107 that drives at least one steered wheel 108 of the truck 10. The controller 103 may communicate with the traction motor controller 106 so as to accelerate, decelerate, adjust and/or otherwise limit the speed of the truck 10 in response to receiving a travel request from the remote control device 70. The controller 103 may also be communicably coupled to a steer controller 112, which is coupled to a steer motor 114 that steers at least one steered wheel 108 of the truck 10. In this regard, the truck may be controlled by the controller 103 to travel a predetermined path or maintain a predetermined heading in response to receiving a travel request from the remote control device 70.

As yet another illustrative example, the controller 103 may be communicably coupled to a brake controller 116 that controls truck brakes 117 to decelerate, stop or otherwise control the speed of the truck in response to receiving a travel request from the remote control device 70. Still further, the controller 103 may be communicably coupled to other vehicle features, such as main contactors 118, and/or other outputs 119 associated with the truck 10, where applicable, to implement desired actions in response to implementing remote travel functionality.

According to various aspects of the present invention, the controller 103 may communicate with the receiver 102 and with the traction controller 106 to operate the vehicle under remote control in response to receiving travel commands from the associated remote control device 70. Moreover, the controller 103 may be configured to perform a first action if the vehicle is traveling under remote control in response to a travel request and an obstacle is detected in a first one of the detection zones. The controller 103 may be further configured to perform a second action different from the first action if the vehicle is traveling under remote control in response to a travel request and an obstacle is detected in a second one of the detection zones. In this regard, when a travel signal is received by the controller 103 from the remote control device 70, any number of factors may be considered by the controller 103 to determine whether the travel signal should be acted upon and what action(s) should be taken, if any. The particular vehicle features, the state/condition of one or more vehicle features, vehicle environment, etc., may influence the manner in which controller 103 responds to travel requests from the remote control device 70.

The controller 103 may also refuse to acknowledge the travel signal depending upon vehicle condition(s), e.g., that relate to environmental or/operational factor(s). For example, the controller 103 may disregard an otherwise valid travel request based upon information obtained from one or more of the sensors 58, 76. For example, according to various aspects of the present invention, the controller 103 may optionally consider factors such as whether an operator is on the truck 10 when determining whether to respond to a travel command from the remote control device 70. For example, as noted above, the truck 10 may comprise at least one presence sensor 58 for detecting whether an operator is positioned on the vehicle. In this regard, the controller 103 may be further configured to respond to a travel request to operate the vehicle under remote control when the presence sensor(s) 58 designate that no operator is on the vehicle.

Any other number of reasonable conditions may also/alternatively be implemented by the controller 103 to interpret and take action in response to received signals. Other exemplary factors are set out in greater detail in U.S. Provisional Patent Application Ser. No. 60/825,688, filed Sep. 14, 2006 entitled "SYSTEMS AND METHODS OF REMOTELY CONTROLLING A MATERIALS HANDLING VEHICLE", U.S. patent application Ser. No. 11/855,310, entitled "SYSTEMS AND METHODS OF REMOTELY CONTROLLING A MATERIALS HANDLING VEHICLE" and U.S. patent application Ser. No. 11/855,324, entitled "SYSTEMS AND METHODS OF REMOTELY CONTROLLING A MATERIALS HANDLING VEHICLE", the disclosures of which are each already incorporated by reference herein.

Upon acknowledgement of a travel request, the controller 103 interacts with the traction motor controller 106, e.g., directly, indirectly, via the CAN bus 110, etc., to advance the truck 10. Depending upon the particular implementation, the controller 103 may interact with the traction motor controller 106 to advance the truck 10 by a predetermined distance. Alternatively, the controller 103 may interact with the traction motor controller 106 to advance the truck 10 for a period of time in response to the detection and maintained actuation of a travel control on the remote 70. Further alternatively, the truck 10 may be configured to jog for as long as a travel control signal is received. Still further alternatively, the controller 103 may be configured to "time out" and stop the travel of the truck 10 based upon a predetermined event, such as exceeding a predetermined time period or travel distance regardless of the detection of maintained actuation of a corresponding control on the remote control device 70.

The remote control device 70 may also be operative to transmit a second type signal, such as a "stop signal", designating that the truck 10 should brake and/or otherwise come to rest. The second type signal may also be implied, e.g., after implementing a "travel" command, e.g., after the truck 10 has traveled a predetermined distance, traveled for a predetermined time, etc., under remote control in response to the travel command. If the controller 103 determines that the signal is a stop signal, the controller 103 sends a signal to the traction controller 106, the brake controller 116 and/or other truck component to bring the truck 10 to a rest. As an alternative to a stop signal, the second type signal may comprise a "coast signal", designating that the truck 10 should coast, eventually slowing to rest.

The time that it takes to bring the truck 10 to a complete rest may vary, depending for example, upon the intended application, the environmental conditions, the capabilities of the particular truck 10, the load on the truck 10 and other similar factors. For example, after completing an appropriate jog movement, it may be desirable to allow the truck 10 to "coast" some distance before coming to rest so that the truck 10 stops slowly. This may be achieved by utilizing regenerative braking to slow the truck 10 to a stop. Alternatively, a braking operation may be applied after a predetermined delay time to allow a predetermined range of additional travel to the truck 10 after the initiation of the stop operation. It may also be desirable to bring the truck 10 to a relatively quicker stop, e.g., if an object is detected in the travel path of the truck 10 or if an immediate stop is desired after a successful jog operation. For example, the controller may apply predetermined torque to the braking operation. Under such conditions, the controller 103 may instruct the brake controller 116 to apply the brakes 117 to stop the truck 10.

Figure 3:
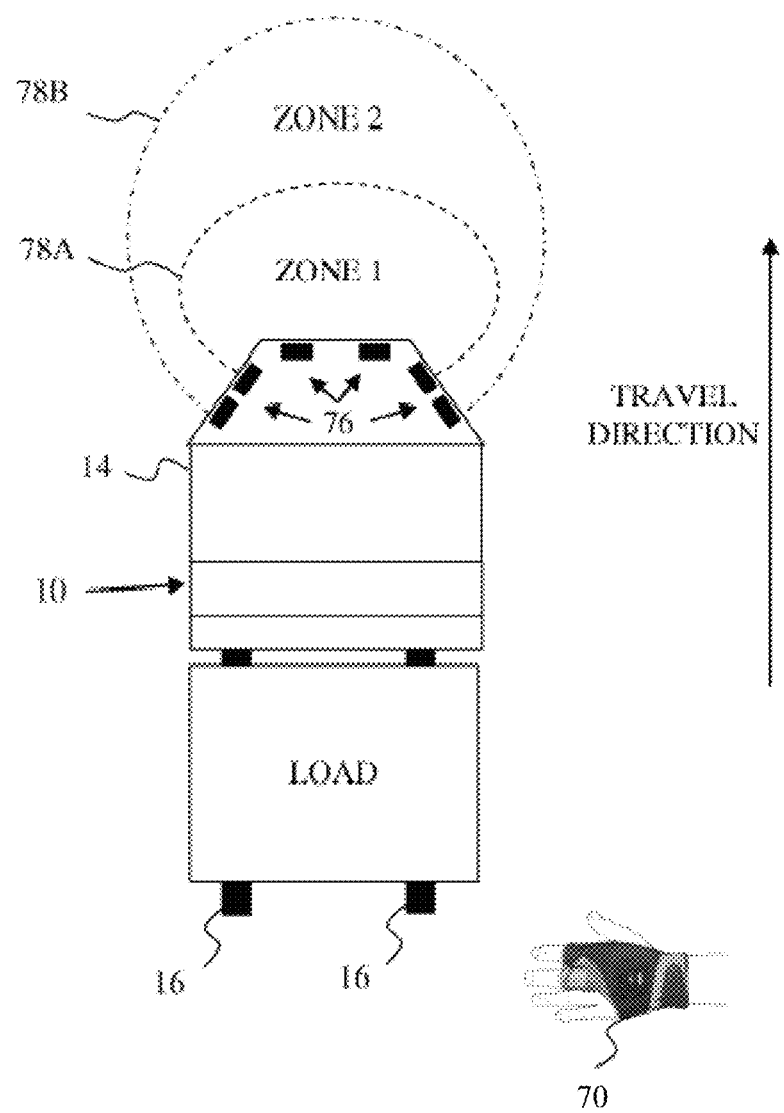
FIG. 3 is a schematic diagram illustrating detection zones of a materials handling vehicle according to various aspects of the present invention.

Detection Zones of a Materials Handling Vehicle:

Referring to FIG. 3, according to various aspects of the present invention, one or more obstacle sensors 76 are configured so as to collectively enable detection of objects/obstacles within multiple "detection zones". In this regard, the controller 103 may be configured to alter one or more operational parameter of the truck 10 in response to detection of an obstacle in one or more of the detection zones as set out in greater detail herein. The control of the vehicle utilizing detection zones may be implemented when an operator is riding/driving the vehicle. The control of the vehicle utilizing detection zones may also be integrated with supplemental remote control as set out and described more fully herein.

Although six obstacle sensors 76 are shown for purposes of clarity of discussion herein, any number of obstacle sensors 76 may be utilized. The number of obstacle sensors 76 will likely vary, depending upon the technology utilized to implement the sensor, the size and/or range of the detection zones, the number of detection zones, and/or other factors.

In the illustrative example, a first detection zone 78A is located proximate to the power unit 14 of the truck 10. A second detection zone 78B is defined adjacent to the first detection zone 78A and appears to generally circumscribe the first detection zone 78A. A third area is also conceptually defined as all area outside the first and second detection zones 78A, 78B. Although the second detection zone 78B is illustrated as substantially circumscribing the first detection zone 78A, any other practical arrangement that defines the first and second detection zones 78A, 78B may be realized. For example, all or certain portions of the detection zones 78A, 78B may intersect, overlap, or be mutual exclusive. Moreover, the particular shape of the detection zones 78A, 78B can vary. Still further, any number of detection zones may be defined, further examples of which are described in greater detail herein.

Still further, the detection zones need not surround the entire truck 10. Rather, the shape of the detection zones may be dependent upon the particular implementation as set out in greater detail herein. For example, if the detection zones 78A, 78B are to be used for speed control while the truck 10 is moving without an operator riding thereon, such as under remote travel control in a power unit first (forks to the rear) orientation, then the detection zones 78A, 78B may be oriented forward of the direction of travel of the truck 10. However, the detection zones can also cover other areas, e.g., adjacent to the sides of the truck 10.

According to various aspects of the present invention, the first detection zone 78A may further designate a "stop zone". Correspondingly, the second detection zone 78B may further designate a "first speed zone". Under this arrangement, if an object, e.g., some form of obstacle, is detected within the first detection zone 78A, and the materials handling vehicle 10 is traveling under remote control in response to a travel request, then the controller 103 may be configured to implement an action such as a "stop action" to bring the truck 10 to a stop. In this regard, travel of the truck 10 may continue once the obstacle is clear, or a second, subsequent travel request from the remote control device 70 may be required to restart travel of the truck 10.

If a travel request is received from the remote control device 70 while the truck is at rest and an object is detected within the first detection zone 78A, then the controller 103 may refuse the travel request and keep the truck at rest until the obstacle is cleared out of the stop zone.

If an object/obstacle is detected within the second detection zone 78B, and the materials handling vehicle 10 is traveling under remote control in response to a travel request, then the controller 103 may be configured to implement a different action. For example, the controller 103 may implement a first speed reduction action to reduce the speed of the vehicle to a first predetermined speed, such as where the vehicle is traveling at a speed greater than the first predetermined speed.

Thus, assume the truck 10 is traveling in response to implementing a travel request from the remote control device at a speed V2 as established by a set of operating conditions where the obstacle sensors 76 do not detect an obstacle in any detection zone. If the truck is initially at rest, the truck may be accelerated up to speed V2. The detection of an obstacle within the second detection zone 78B (but not the first detection zone 78A) may cause the truck 10, e.g., via the controller 103, to alter at least one operational parameter, e.g., to slow down the truck 10 to a first predetermined speed V1, which is slower than the speed V2. That is, V1<V2. Once the obstacle is cleared from the second detection zone 78B, the truck 10 may resume its speed V2, or the truck 10 may maintain its speed V1 until the truck stops and the remote control device 70 initiates another travel request. Still further, if the detected object is subsequently detected within the first detection zone 78A, the truck 10 will be stopped as described more fully herein.

Assume as an illustrative example, that the truck 10 is configured to travel at a speed of approximately 2.5 miles per hour (mph) (4 Kilometers per hour (Km/h)) if the truck 10 is traveling without an operator and is under remote control in response to a travel request from a corresponding remote control 70, so long as no object is detected in a defined detection zone. If an obstacle is detected in the second detection zone 78B, then the controller 103 may adjust the speed of the truck 10 to a speed of approximately 1.5 mph (2.4 Km/h) or some other speed less than 2.5 miles per hour (mph) (4 Kilometers per hour (Km/h)). If an obstacle is detected in the first detection zone 78A, then the controller 103 stops the truck 10.

The above example assumes that the truck 10 is traveling under remote control without an operator. In this regard, the obstacle sensors 76 can be used to adjust the operating conditions of the unoccupied truck 10. However, the obstacle sensors 76 and corresponding controller logic may also be operative when the truck 10 is being driven by an operator, e.g., riding on the platform or other suitable location of the truck 10. Thus, according to various aspects of the present invention, the controller 103 may stop the vehicle or refuse to allow the vehicle to move if an object is detected within the stop zone 78A regardless of whether the truck is being driven by an operator or operating under remote control. Correspondingly, depending upon the specific implementation, the speed control capability of the second detection zone 78B may be implemented regardless of whether the vehicle is operating unoccupied under remote control, or whether an operator is riding on the vehicle while driving it.

However, according to various aspects of the present invention, there may be situations where it is desirable to disable one or more of the detection zones when the truck 10 is being driven by an operator. For example, it may be desirable to override/disable the obstacle sensors 76/controller logic while the operator is driving the truck 10 regardless of external conditions. As a further example, it may be desirable to override/disable the obstacle sensors 76/controller logic while the operator is driving the truck 10 to allow the operator to navigate the truck 10 in tight quarters, e.g., to navigate tight spaces, travel around corners, etc., that might otherwise activate one or more of the detection zones. As such, the activation of the controller logic to utilized the detection of objects in the detection zones to control the vehicle while the vehicle is occupied by an operator, according to various aspects of the present invention, may be manually controlled, programably controlled or otherwise selectively controlled.

Figure 4:
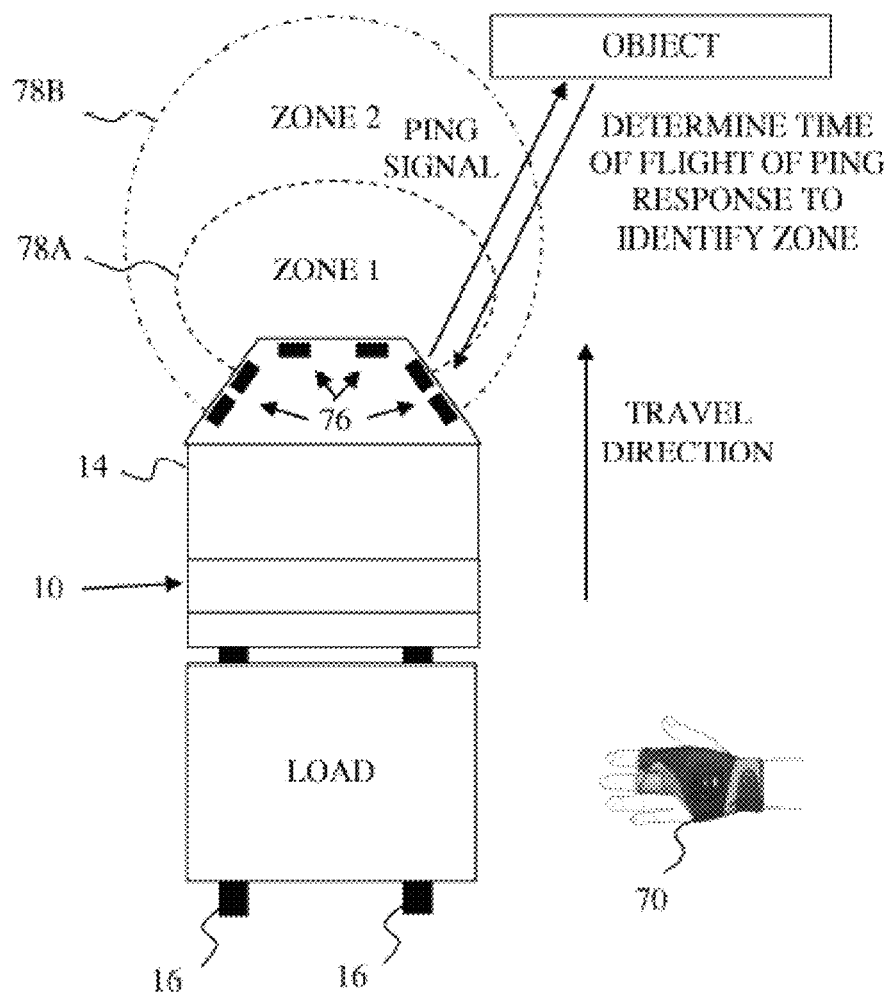
FIG. 4 is a schematic diagram illustrating an exemplary approach for detecting an object according to various aspects of the present invention.

Referring to FIG. 4, according to further aspects of the present invention, one or more of the obstacle sensors 76 may be implemented by ultrasonic technology or other suitable contactless technology capable of a distance measurement and/or position determination. Thus, the distance to an object can be measured, and/or a determination may be made so as to ascertain whether the detected object is within a detection zone 78A, 78B, e.g., by virtue of the distance of the object from the truck 10. As an example, an obstacle sensor 76 may be implemented by an ultrasonic sensor that provides a "ping" signal, such as a high frequency signal generated by a piezo element. The ultrasonic sensor 76 then rests and listens for a response. In this regard, time of flight information may be determined and utilized to define each zone. Thus, a controller, e.g., the controller 103 or a controller specifically associated with the obstacle sensors 76 may utilize software that looks at time of flight information to determine whether an object is within a detection zone.

According to further aspects of the present invention, multiple obstacle sensors 76 can work together to obtain object sensing. For example, a first ultrasonic sensor may send out a ping signal. The first ultrasonic sensor and one or more additional ultrasonic sensors may then listen for a response. In this way, the controller may use diversity in identifying the existence of an object within one or more of the detection zones.

Figure 5:
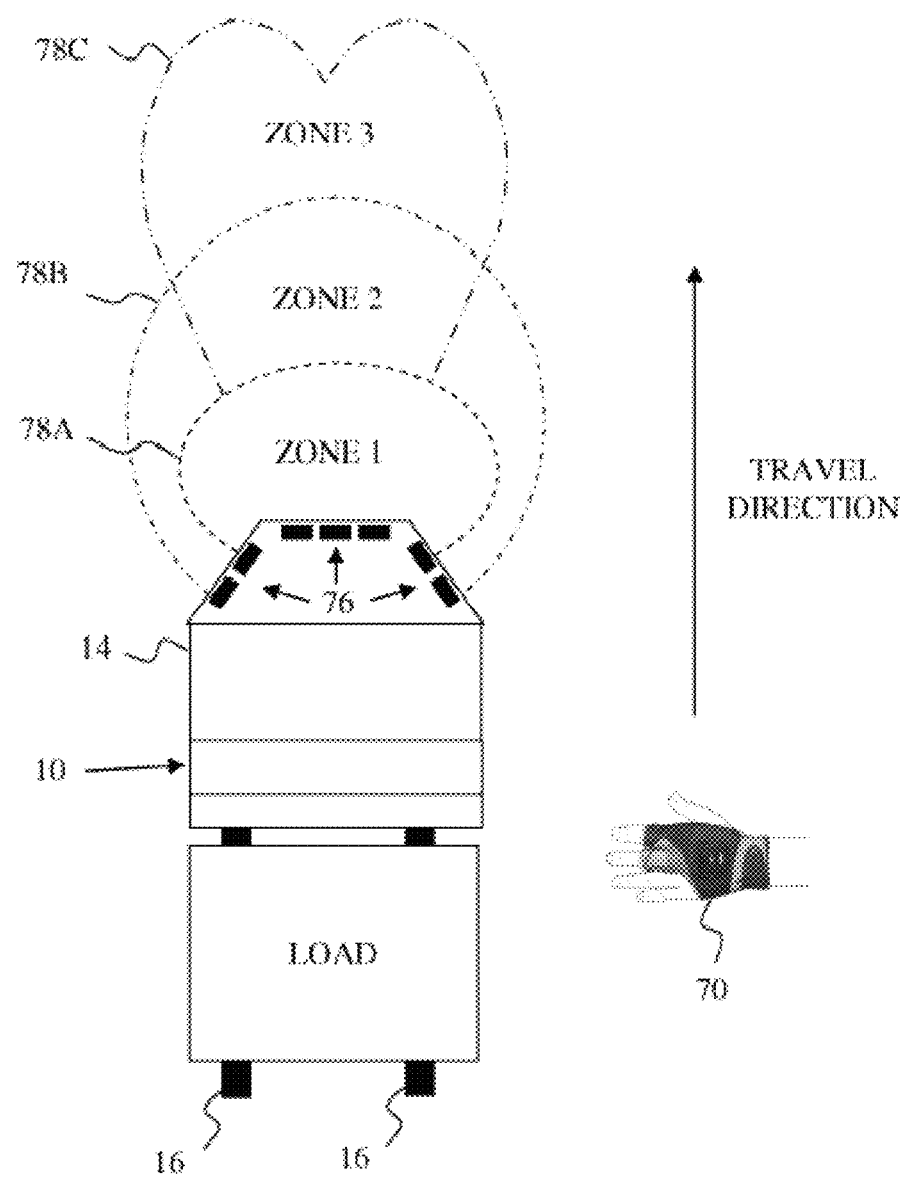
FIG. 5 is a schematic diagram illustrating a plurality of detection zones of a materials handling vehicle according to further aspects of the present invention.

With reference to FIG. 5, an implementation of multiple speed zone control is illustrated according to yet further aspects of the present invention. As illustrated, three detection zones are provided. If an object such as an obstacle is detected in the first detection zone 78A and the truck 10 is moving under remote control, then a first action may be performed, e.g., the truck 10 may be brought to a stop as described more fully herein. If an object such as an obstacle is detected in the second detection zone 78B and the truck 10 is moving under remote control, then a second action may be performed, e.g., the vehicle speed may be limited, reduced, etc. Thus, the second detection zone 78B may further designate a first speed zone. For example, the speed of the truck 10 may be reduced and/or limited to a first relatively slow speed, e.g., approximately 1.5 mph (2.4 Km/h).

If an object such as an obstacle is detected in the third detection zone 78C and the truck 10 is moving under remote control, then a third action may be performed, e.g., the truck 10 may be reduced in speed or otherwise limited to a second speed, e.g., approximately 2.5 mph (4 Km/h). Thus, the third detection zone may further designate a second speed zone. If no obstacles are detected in the first, second and third detection zones 78A, 78B, 78C, then the vehicle may be remotely controlled to travel, e.g., in response to a remote travel request, at a rate that is greater than the rate of speed when an obstacle is in the third detection zone, e.g., a speed of approximately 4 mph (6.2 Km/h).

As FIG. 5 further illustrates, the detection zones may be defined by different patterns relative to the truck 10. Also, in FIG. 5, a seventh obstacle sensor 76 is illustrated for purposes of illustration. By way of illustration, the seventh obstacle sensor 76 may be approximately centered, such as on the bumper or other suitable location on the truck 10. On an exemplary truck 10, the third zone 78C may extend approximately 6.5 feet (2 meters) forward of the power unit 14 of the truck 10.

According to various aspects of the present invention, any number of detection zones of any shape may be implemented. For example, depending upon desired truck performance, many small zones may be defined at various coordinates relative to the truck 10. Similarly, a few large detection zones may be defined based upon desired truck performance. As an illustrative example, a table may be set up in the memory of the controller. If travel speed while operating under remote travel control is an operational parameter of interest, then the table may associate travel speed with the detection zones defined by distance, range, position coordinates or some other measure. If the truck 10 is traveling under remote control and an obstacle sensor detects an object, then the distance to that detected object may be used as a "key" to look up a corresponding travel speed in the table. The travel speed retrieved from the table can be utilized by the controller 103 to adjust the truck 10, e.g., to slow it down, etc.

Depending upon factors such as the desired speed of the truck when operating under remote control and the required stopping distance, the anticipated load to be transported by the truck 10, whether a certain amount of coast is required for load stability, vehicle reaction time, etc., the areas of each detection zone may be chosen. Moreover, factors such as the range of each desired detection zone, etc. may be considered to determine the number of obstacle sensors 76 required. In this regard, such information may be static, or dynamic, e.g., based upon operator experience, vehicle load, nature of the load, environmental conditions, etc.

As an illustrative example, in a configuration with multiple detection zones, e.g., three detection zones, as many as seven or more object detectors, e.g., ultrasonic sensors, laser sensors, etc. may be required to provide a range of coverage desired by a corresponding application. In this regard, the detector(s) may be able to look ahead of the direction of travel of the vehicle by a sufficient distance to allow the appropriate response, e.g., to slow down. In this regard, at least one sensor may be capable of looking several meters forward in the direction of travel of the truck 10.

According to various aspects of the present invention, the multiple detection speed zones allow a relatively greater maximum forward travel speed while operating under remote control that prevents unnecessarily early vehicle stops by providing one or more intermediate zones where the vehicle slows down before deciding to come to a complete stop.

Figure 6:
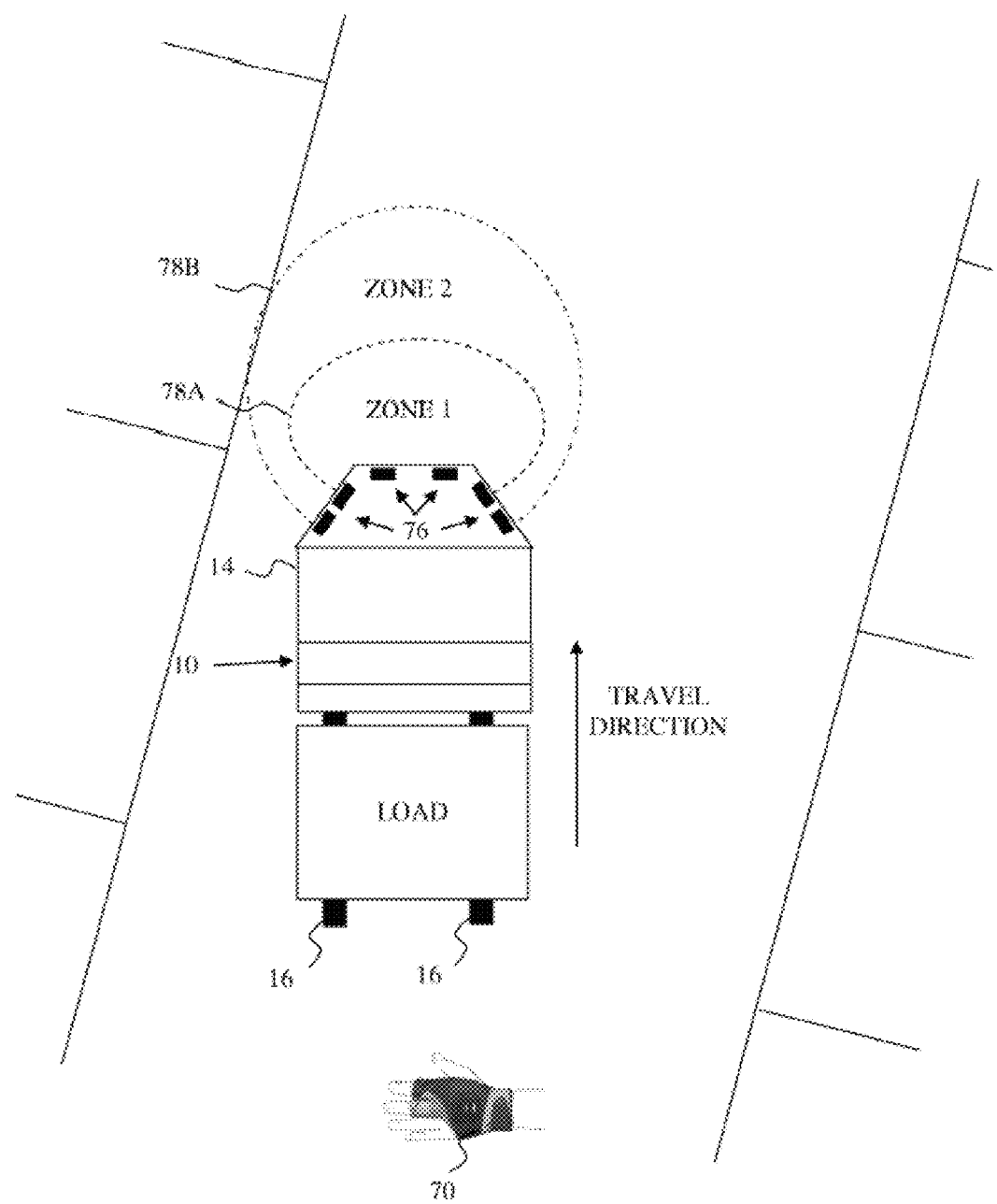
FIG. 6 is a schematic diagram illustrating a materials handling vehicle operating under supplemental remote control in a warehouse aisle according to various aspects of the present invention.

According to further aspects of the present invention, the utilization of multiple detection zones allows a system that rewards the corresponding operator for better alignment of the truck 10 during pick operations. For example, referring to FIG. 6, an operator has positioned the truck 10 so as to not be aligned with a warehouse aisle. As such, as the vehicle is jogged forward, the second detection zone 78B may initially detect an obstacle such as a pick bin or warehouse rack. In response to detecting the rack, the vehicle will slow down. If the rack is sensed in the first detection zone 78A, then the vehicle will come to rest, even if the truck 10 has not jogged its entire programmed jog distance. Similar unnecessary slow downs or stops may also occur in congested and/or messy aisles.

According to various aspects of the present invention, the truck 10 may make decisions based upon the information obtained from the obstacle sensors 76. Moreover, the logic implemented by the truck 10 in response to the detection zones may be changed or varied depending upon a desired application. As a few illustrative examples, the boundaries of each zone in a multiple zone configuration may be programably (and/or reprogramably) entered in the controller, e.g., flash programmed. In view of the defined zones, one or more operational parameters may be associated with each zone. The established operational parameters may define a condition, e.g., maximum allowable travel speed, an action, e.g., brake, coast or otherwise come to a controlled stop, etc. The action may also be an avoidance action. For example, an action may comprise adjusting a steer angle or heading of the truck 10.

Obstacle Avoidance

According to further aspects of the present invention, the detection zones may be utilized to perform obstacle avoidance. As noted in greater detail herein, the controller may further communicate with a steer controller of the vehicle. As such, one or more of the detection zones may be designated as steer angle correction zone(s). In this regard, the controller 103 may be further configured to implement a steer angle correction if an obstacle is detected in the steer angle correction zone(s).

For example, when performing stock picking operations, a vehicle operator may not position the vehicle on the exact heading necessary to jog down a warehouse aisle. Rather, the vehicle may be slightly skewed with regard to the bins along the aisle edge. In that regard, the vehicle may have a heading that would cause the vehicle to steer into a rack. Accordingly, the operational parameters adjusted when an obstacle is detected in a particular zone may include steer angle correction in addition to, or in lieu of vehicle speed adjustment. Under this arrangement, the vehicle may utilize a servo controlled steering system. The controller can integrate, communicate or otherwise alter the control of the servo to change the steer heading of the truck 10.

When making steer angle corrections, it may be necessary for the controller to determine whether the steer correction should be made to turn the vehicle to the left or to the right. In this regard, the obstacle sensors 76 or some other additional/ancillary sensors are configured to communicate information to the controller 103 to enable the controller 103 to make direction based decisions in response to detecting an object in a detection zone. As an illustrative example, where a plurality of obstacle sensors 76 are provided, the detection zones may be bisected so that a detected object may be discerned, for example, as being to the right or left of the truck 10.

Figure 7:
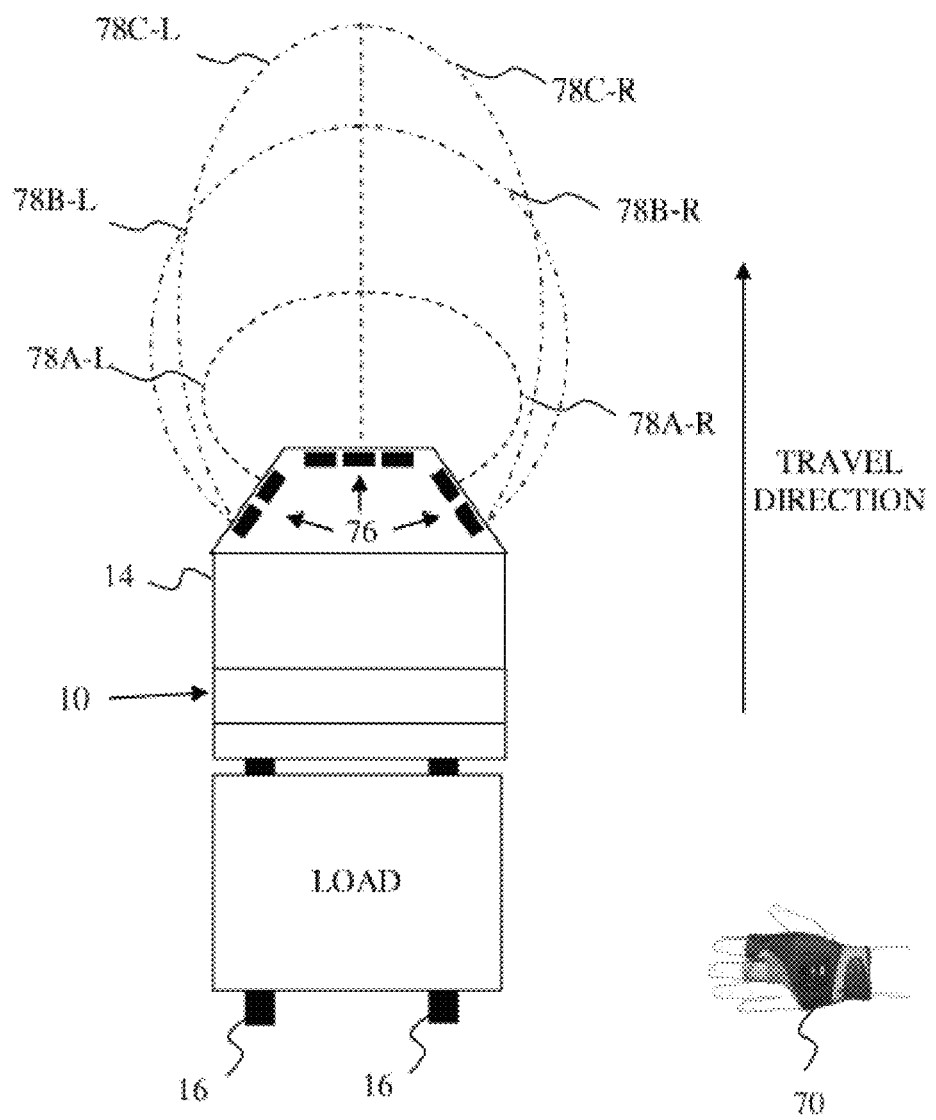
FIG. 7 is a schematic diagram illustrating a plurality of detection zones of a materials handling vehicle which are capable of distinguishing direction according to further aspects of the present invention.

For example, referring to FIG. 7, each detection zone is further subdivided into a left and right component. Although shown as two subdivisions for purposes of illustration, any reasonable number of subdivisions may be utilized, depending upon the capability of the particular obstacle sensors 76 that are utilized in an implementation.

Steer correction, e.g., to automatically align the truck 10 within a warehouse aisle, is a difficult task. If an under-correction is applied, or if the steer correction is not applied in a timely, appropriate manner, the vehicle may not properly adjust the truck to an appropriate heading. Thus, operator involvement is required to straighten out the vehicle. This takes away picking time from the operator.

However, if the steer correction overcompensates the steer angle, it is possible that the vehicle will "ping pong" back and forth down the aisle. This is also a potential waste of time for the picker. This ping pong affect may also cause congestion in crowded warehouse aisles.

Referring back to FIG. 2, the controller 103 may communicate, e.g., via the CAN bus 110 or by other means, with a steer control system, e.g., the steer controller 112, to cause the truck 10 to adjust a travel path of the truck 10. For example, the controller 103 may communicate with a steer controller 112 to command or otherwise control a steer motor 114 or other suitable control device, which also couples to the steered wheel(s) 108 of the truck 10. The controller 103 may straighten out the truck 10, or adjust a steer angle of the truck 10 before or during a wireless remote control initiated travel operation. As such, the controller 103 may default to a mode of operation wherein the truck 10 travels in a straight direction or along a predetermined heading when the truck 10 is moving under wireless remote control in response to receipt of a travel request. The controller 103 may further impose a steer angle limit during remote control operations if the truck 10 is to travel in a direction where the steered wheel(s) 108 is not straight. For example, the controller 103 may limit the angle that the truck 10 can travel when executing remote controlled travel requests to a range of approximately 5 to 10 degrees. Thus, in addition to jogging the traction motor 107, the controller 103 may also straighten out or otherwise adjust or control the steered wheel 108.

According to various aspects of the present invention, detection zones are utilized to implement steer angle compensation. In particular, a first steer correction is associated with a first one of the zones, e.g., the outer-most zone. Where multiple zones are provided, multiple steer angle correction amounts can be associated with each zone.

Figure 8:
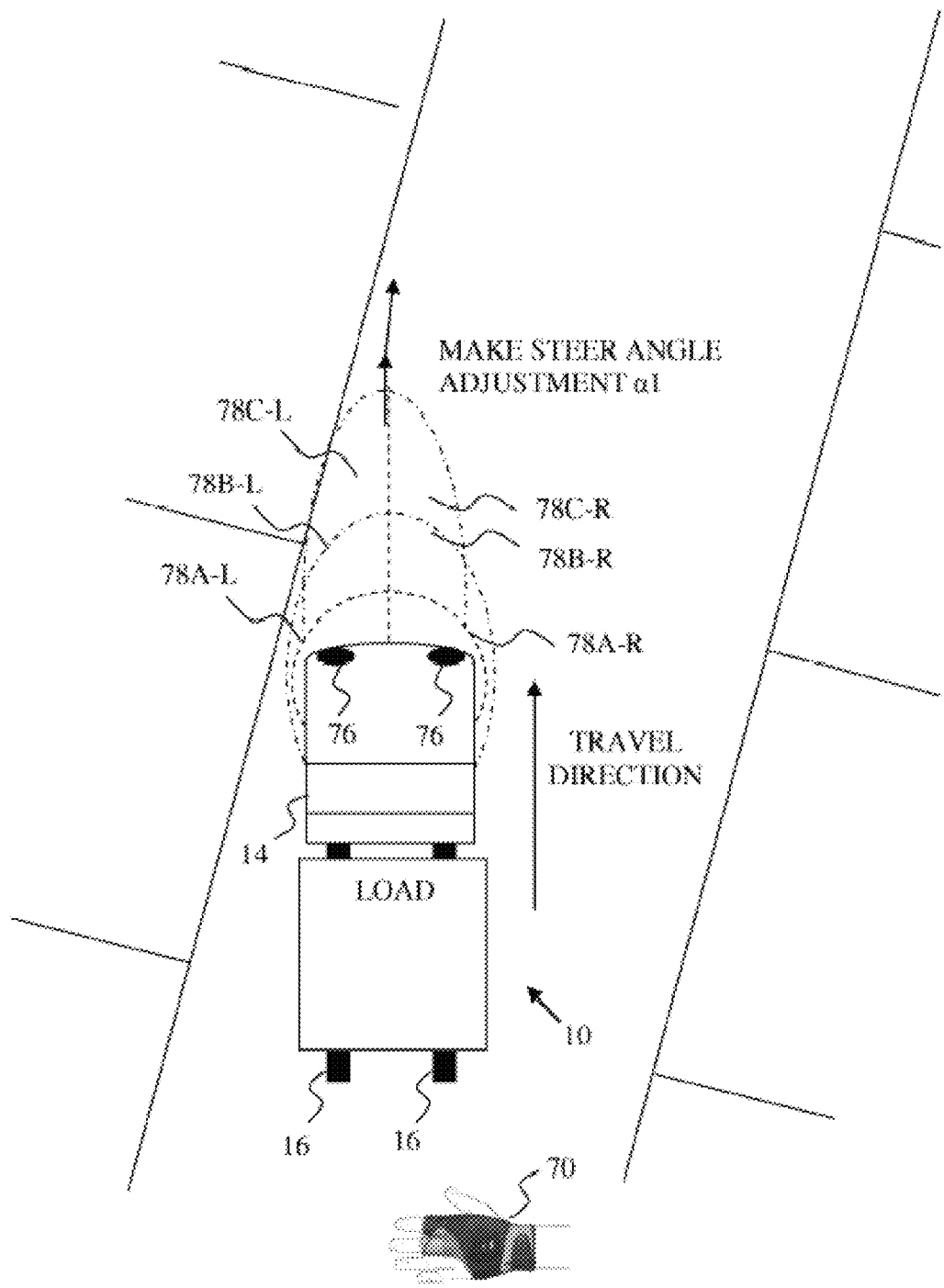
FIGS. 8-10 illustrate the use of a plurality of detection zones to implement a steering correction of a materials handling vehicle that is operating under supplemental remote control according to various aspects of the present invention.

As an illustrative example, as illustrated in FIG. 8, a truck 10 is traveling down a warehouse aisle along a heading that is directing the truck towards a rack (not parallel to the aisle passageway). The truck 10 is operating under remote control utilizing a plurality, e.g., three detection zones. A first steer correction angle $\alpha 1$ is associated with the outer-most zone (third detection zone in this example). A second steer correction angle $\alpha 2$ is associated with the adjacent zone (second detection zone in this example). In addition, a speed reduction may be associated with the third detection zone, a different speed reduction may be associated with the second detection zone and a stop zone may be associated with the first detection zone.

Figure 9:
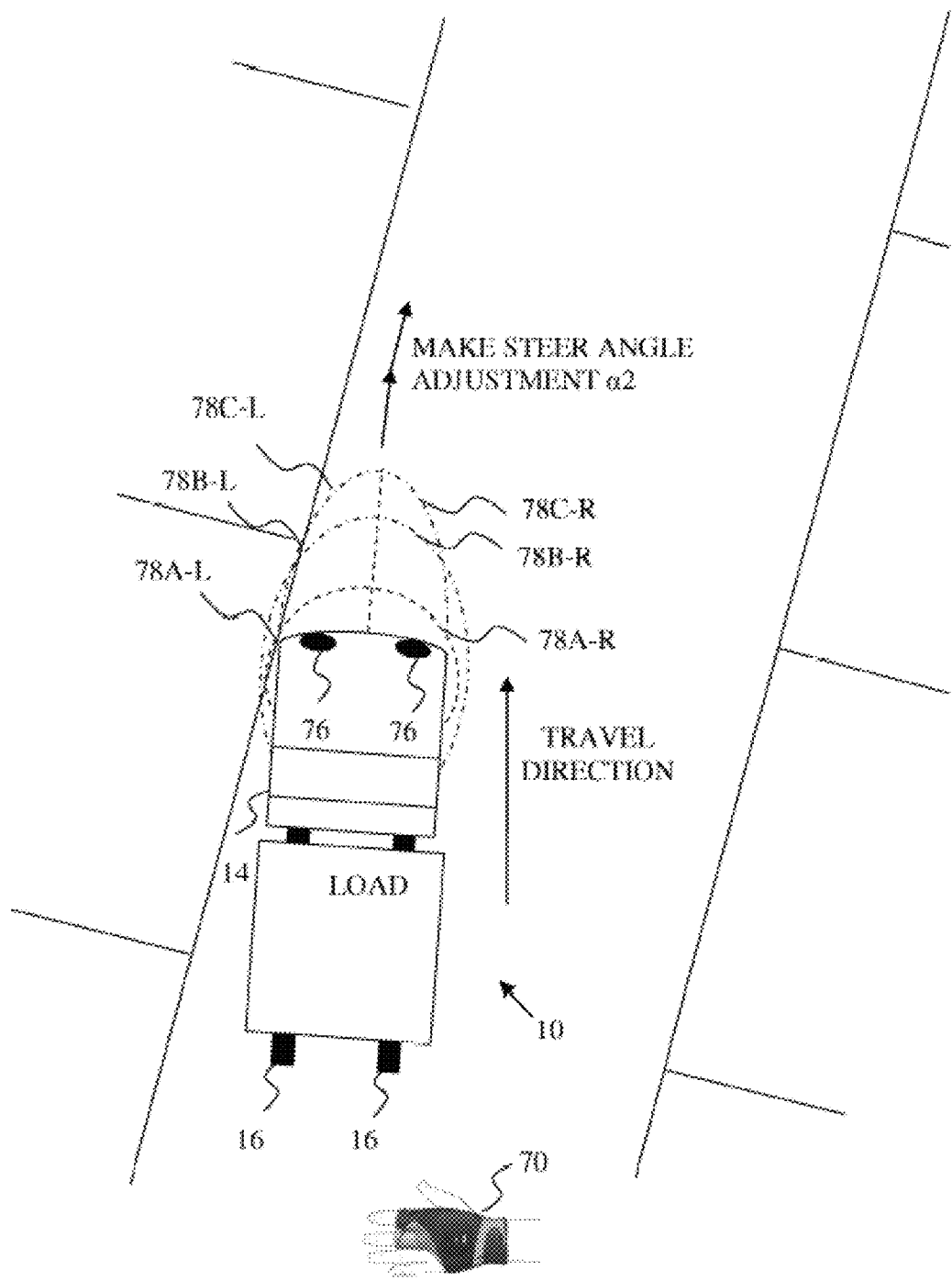

Further, the steer angle correction may be different for each zone. As illustrated, the rack has breached the third detection zone to the left of the truck 10. In response thereto, the controller 103 causes the truck 10 to implement a first steer correction $\alpha 1$. With reference to FIG. 9, the truck 10 has slowed down by virtue of entering zone 3. The truck 10 has also implemented a first steer angle correction $\alpha 1$. However, in this illustrative example, the controller detects the rack in the second detection zone, again, to the left of the truck 10. In response thereto, the controller causes the truck to implement a steer correction $\alpha 2$ associated with zone 2.

Figure 10:
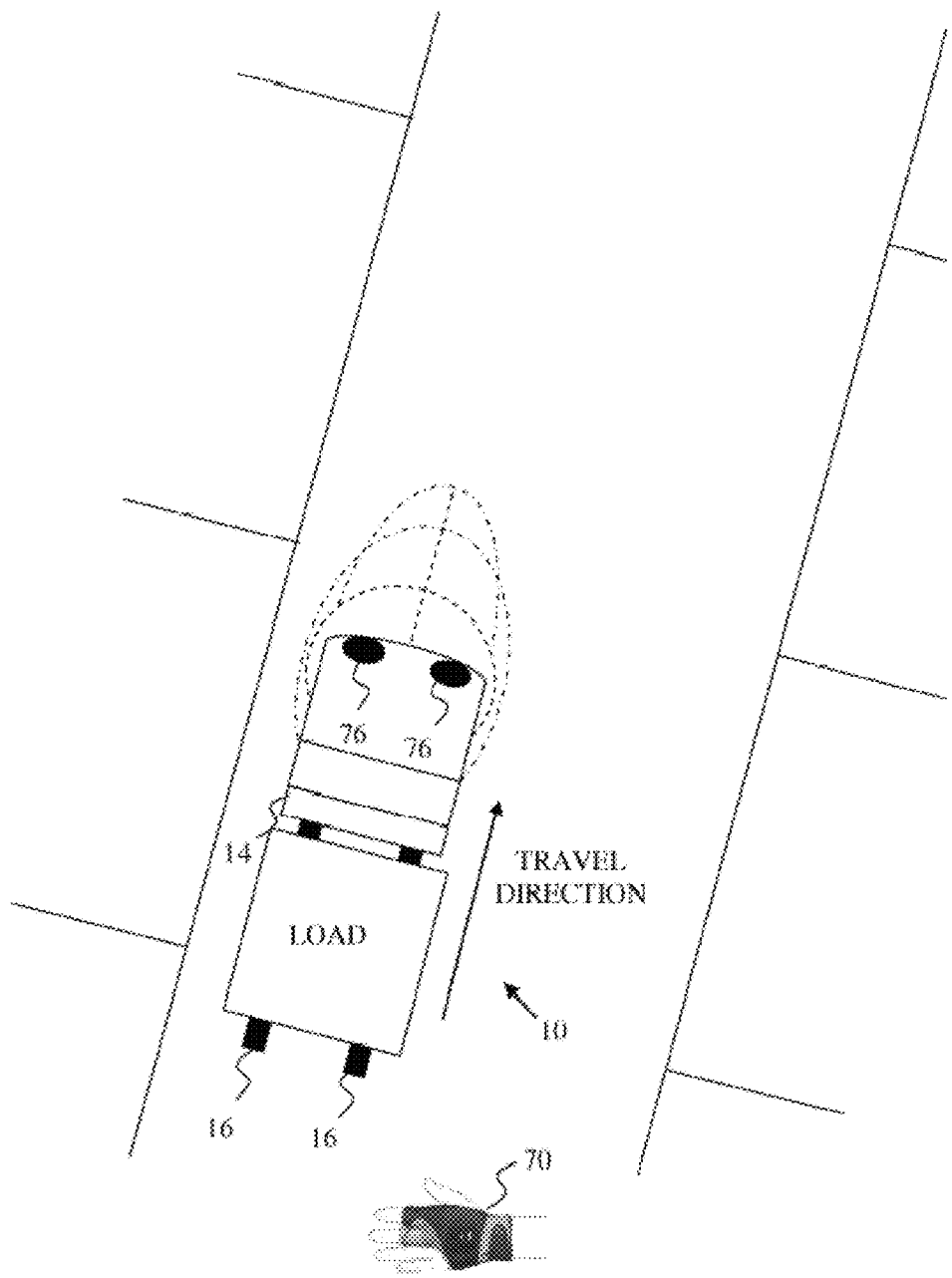

Referring to FIG. 10, upon implementing the steer angle correction, the truck 10 is suitably positioned to travel down the warehouse aisle.

By way of illustration, and not by way of limitation, $\alpha 1 < \alpha 2$. Thus, for example, $\alpha 1$ may comprise a steer angle correction of approximately 2 degrees, whereas $\alpha 2$ may comprise a steer angle correction of approximately 5 degrees. After the appropriate corrections of steer angle, the vehicle is adjusted to a heading that extends substantially parallel to the aisle passageway. The particular angles may vary depending upon a number of factors. Moreover, the steer angle may be statically programmed, or the angle may dynamically vary, e.g., depending upon one or more conditions.

According to aspects of the present invention, the steer correction results in the truck traveling down the warehouse aisle such that the rack does not breach any of the detection zones. This allows the truck 10 to travel under remote control at its maximum speed without incurring the speed reduction that occurs when an object is detected within a detection zone.

In practice, the range of each obstacle sensor 76 may be different, depending upon the specific implementation and selection of proximity detecting technology. For example, one or more of the obstacle sensors 76 towards the front of the power unit 14 may have a range of approximately 0-5 feet (0-1.5 meters) or more and the obstacle sensors 76 to the sides of the power unit 14 may have a range of approximately 0-2 feet (0-0.6 meters). Moreover, the detection range of the obstacle sensors 76 may be adjustable or be otherwise made dynamically variable. For example, the range of the obstacle sensors 76 may be extended if certain operating conditions are detected, etc. As an example, the range of the obstacle sensors 76 may be adjusted based upon the speed of the truck 10 when advancing under wireless remote control.

Algorithm

Figure 11:
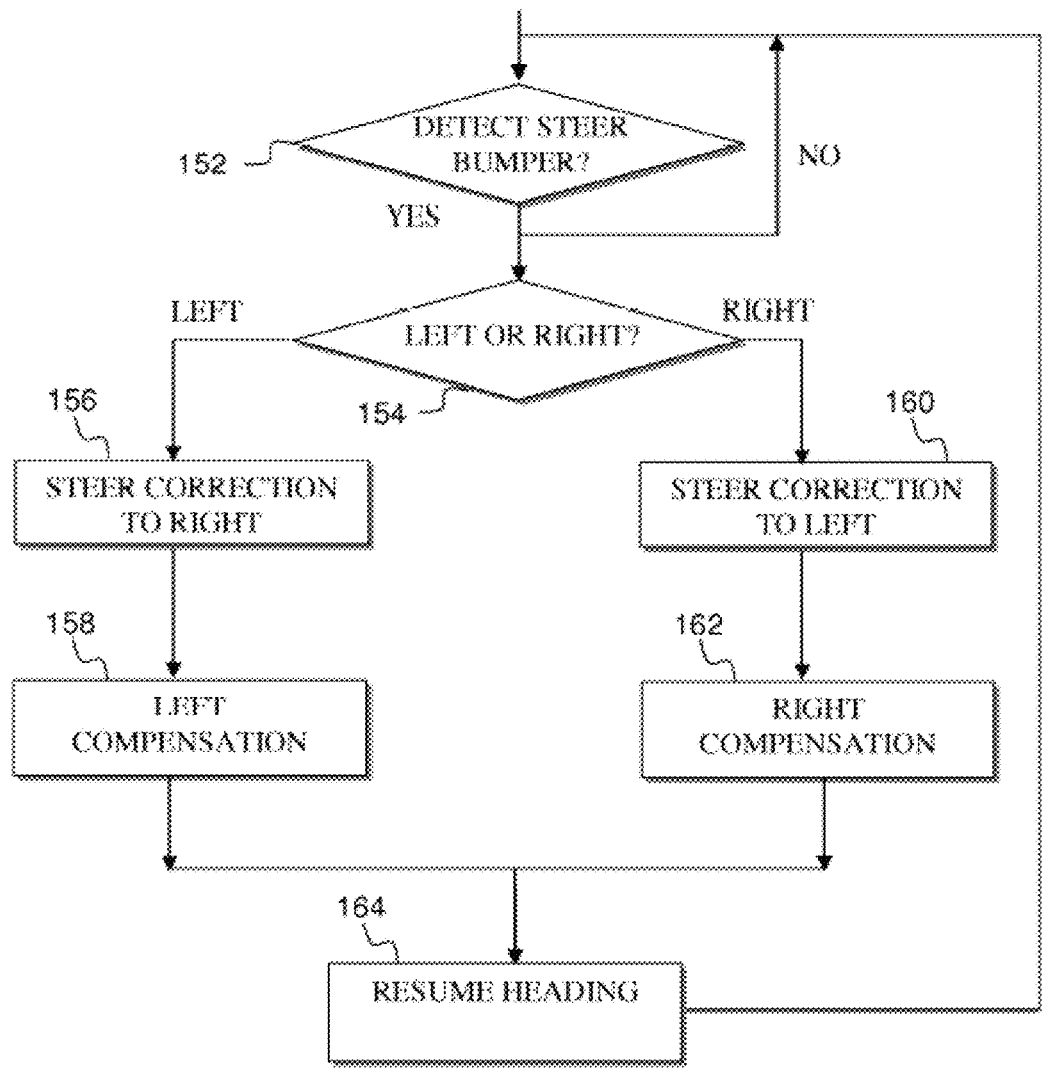
FIG. 11 is a flow chart of a method of implementing steer correction according to various aspects of the present invention.

According to various aspects of the present invention, a steer correction algorithm is implemented, e.g., by the controller 103. Referring to FIG. 11, a steer correction algorithm comprises determining whether a steer bumper zone warning is detected at 152. A steer bumper signal warning at 152 may comprise, for example, detecting the presence of an object within first and/or second steer bumper zones 132A, 132B with a laser sensor 200, such as a model number LMS 100 or LMS 111 laser sensor manufactured by Sick AG located in Waldkirch, Germany. The laser sensor 200 may be mounted to the power unit 14, see FIG. 12. The first steer bumper zone 132A may also be designated as a left steer bumper zone and the second steer bumper zone 132B may also be designated as a right steer bumper zone, see FIG. 12. If a steer bumper zone warning is received, a determination is made at 154 whether the steer bumper zone warning indicates that an object is detected to the left or to the right of the truck 10, e.g., whether the detected object is in the first steer bumper zone 132A or the second steer bumper zone 132B. For example, the laser sensor 200 may generate two outputs, a first output signal designating whether an object is detected in the first (left) steer bumper zone 132A, and a second signal designating whether an object is detected in the second (right) steer bumper zone 132B. Alternatively, the controller 103 may receive raw laser sensor data and process/distinguish the first and second steer bumper zones 132A, 132B using a predetermined mapping.

Figure 12:
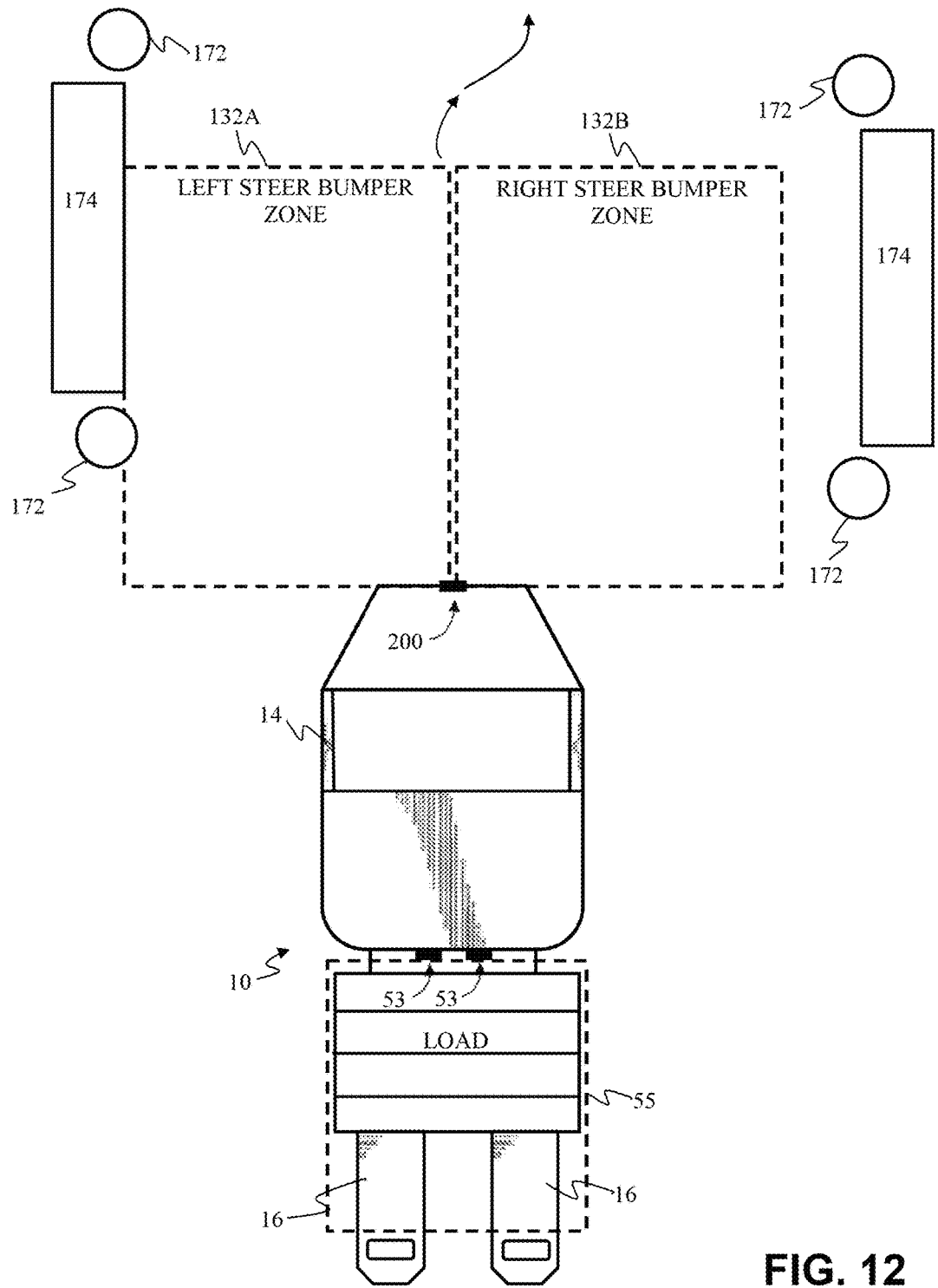
FIG. 12 is a schematic illustration of a materials handling vehicle traveling down a narrow warehouse aisle under remote wireless operation, which is automatically implementing a steer correction maneuver according to various aspects of the present invention.

For example, referring additionally to FIG. 12, the laser sensor 200 may sweep a laser beam in an area in front of truck 10. In this regard, multiple laser sensors may be utilized, or one or more laser beams may be swept, e.g., to raster scan one or more areas forward of the truck 10. If an object is present in an area where the laser beams are swept, the object reflects the beam back to the laser sensor 200, which is capable of generating object location data from which the location of the sensed object can be determined either by the sensor 200 or the controller 103, as is known in the laser sensor art. In this regard, the laser sensor 200 may independently define and scan the left and right steer bumper zones, or the controller 103 may derive the left and/or right steer bumper zones based upon the raster scan of the laser(s). Still further, alternate scanning patterns may be utilized, so long as the controller 103 can determine whether a detected obstacle is to the left or to the right of the truck 10.

As a few additional examples, although a laser sensor 200 is illustrated for purposes of discussion herein, other sensing technologies may be utilized, examples of which may include ultrasonic sensors, infrared sensors, etc. For example, ultrasonic sensors, e.g., located to the sides of the truck 10, may define the left and right steer bumper zones 132A, 132B. Selection of the type(s) of sensors used on the truck 10 may depend upon the particular operating conditions of the truck 10.

Additionally, the laser sensor 200 or one or more additional sensors may be used to define other detection zones, e.g., for stopping, speed limiting, etc. The laser sensor 200 (or one or more additional sensors) may define a "stop zone", and/or a "slow down zone" as described in detail herein. For example, if a single stop zone is defined and an object is detected in the stop zone, which may extend, for example, about 1.2 meters in front of a forward traveling direction of the truck 10, the controller 103 may cause the truck 10 to stop, as set out in detail herein. Additionally or alternatively, if an object is detected in a slow down zone, the controller 103 may cause the truck 10 to slow down. It is noted that, according to this embodiment, it may be preferable to define a stop zone while not defining a slow down zone.

Further, the truck 10 may comprise one or more load presence sensors 53, see FIG. 12. The load presence sensor(s) 53 may comprise proximity or contact technology, e.g., a contact switch, a pressure sensor, an ultrasonic sensor, optical recognition device, infrared sensor or other suitable technology that detects the presence of a suitable load carrying structure 55, e.g., a pallet or other platform, collection cage, etc. The controller 103 may refuse to implement a travel command if one or more of the load presence sensors 53 indicate that the load platform 55 is not in a valid designated position. Still further, the controller 103 may communicate with the brake controller 108 to stop the truck 10 if the load presence sensors 53 detect a change of the load platform 55 from a valid designated position.

It should be understood that any number of detection zones may be implemented, and the implemented detection zones may overlap or define discrete, mutually exclusive zones. Depending upon the sensor and sensor processing technologies utilized, the input(s) to the controller 103 designating an object in the steer bumper zones 132A, 132B may be in other formats. As yet a further illustration, the first and second laser steer bumper zones 132A, 132B may be defined by both ultrasonic sensors and one or more laser sensors. For example, the laser sensor 200 may be utilized as a redundant check to verify that the ultrasonic sensors properly detect an object in either the left or right steer bumper zones 132A, 132B, or vice versa. As yet a further example, ultrasonic sensors may be utilized to detect an object in the left or right steer bumper zones 132A, 132B and the laser sensor 200 may be utilized to distinguish or otherwise locate the object to determine whether the object was detected in the left steer bumper zone 132A or the right steer bumper zone 132B. Other arrangements and configurations may alternatively be implemented.

If a steer bumper zone warning designates that an object is detected in the left steer bumper zone 132A, then a steer correction routine is implemented at 156 that includes computing a steer angle correction to steer the truck 10 to the right according to a first set of parameters. By way of illustration and not by way of limitation, a steer right correction implemented at 156 may include steering the truck 10 to the right at a right direction steer angle. In this regard, the right direction steer angle may be fixed or variable. For example, the controller 103 may command the steer controller 112 to ramp up to some desired steer angle, e.g., 8-10 degrees to the right. By ramping up to a fixed steer angle, sudden changes in the angle of the steer wheel(s) will not occur, resulting in a smoother performance. The algorithm accumulates the distance traveled at the steer correction angle, which may be a function of how long the appropriate steer bumper input is engaged.

According to various aspects of the present invention, the steered wheel angular change may be controlled to achieve, for example, a substantially fixed truck angle correction as a function of accumulated travel distance. The travel distance accumulated while performing a steer correction maneuver may be determined based upon any number of parameters. For example, the distance traveled during the steer correction may comprise the distance traveled by the truck 10 until the detected object is no longer within the associated left bumper detection zone 132A. The accumulated travel distance may also/alternatively comprise, for example, traveling until a time out is encountered, another object is detected in any one of the bumper or detection zones, and/or predetermined maximum steer angle is exceeded, etc.

Upon exiting a right steer correction at 156, e.g., by maneuvering the truck 10 so that no object is detected within the left steer bumper detection zone 132A, a left steer compensation maneuver is implemented at 158. The left steer compensation maneuver at 158 may comprise, for example, implementing a counter steer to adjust the travel direction of the truck 10 to an appropriate heading. For example, the left steer compensation maneuver may comprise steering the truck 10 at a selected or otherwise determined angle for a distance that is a percentage of the previously accumulated travel distance. The left steer angle utilized for the left steer compensation maneuver may be fixed or variable, and may be the same as, or different from the steer angle utilized to implement the right steer correction at 156.

By way of illustration and not by way of limitation, the distance utilized for the left steer compensation maneuver at 158 may be approximately one quarter to one half of the accumulated travel distance while implementing the right steer correction at 156. Similarly, the left steer angle to implement the left steer compensation maneuver may be approximately one half of the angle utilized to implement the right steer correction at 156. Thus, assume that the right steer angle is 8 degrees and the accumulated steer correction travel distance is 1 meter. In this example, the left steer compensation may be approximately one half of the right steer correction, or −4 degrees, and the left steer compensation will occur for a travel distance of approximately ¼ meters to ½ meters.

The particular distance and/or angle associated with the left steer compensation maneuver at 158 may be selected, for example, so as to dampen the "bounce" of the truck 10 as the truck 10 moves along its course to steer correct away from detected obstacles. As an illustration, if the truck 10 steer corrects at a fixed degrees per distance traveled, the controller 103 may be able to determine how much the corresponding truck angle has changed, and therefore, adjust the left steer compensation maneuver at 158 to correct back towards the original or other suitable heading. Thus, the truck 10 will avoid "ping ponging" down an aisle and instead, converge to a substantially straight heading down the center of the aisle without tedious manual repositioning required by the truck operator. Moreover, the left steer compensation maneuver at 158 may vary depending upon the particular parameters utilized to implement the right steer correction at 156.

Correspondingly, if a steer bumper zone warning designates that an object is detected in the right steer bumper zone 132B, then a steer correction routine is implemented at 160 that includes computing a steer angle correction to steer the truck 10 to the left according to a second set of parameters. By way of illustration and not by way of limitation, a steer left correction implemented at 160 may include steering the truck 10 to the left at a left steer angle. In this regard, the left steer correction maneuver at 160 may be implemented in a manner analogous to that described above at 156, except that the correction is to the right at 156 and to the left at 160.

Similarly, upon exiting a left steer correction at 160, e.g., by maneuvering the truck 10 so that no object is detected within the right bumper detection zone 132B, a right steer compensation maneuver is implemented at 162. The right steer compensation maneuver at 162 may comprise, for example, implementing a counter steer to adjust the travel direction of the truck 10 to an appropriate heading in a manner analogous to that described at 158, except that the steer compensation maneuver at 158 is to the left and the steer compensation maneuver at 162 is to the right.

After implementing the steer compensation maneuver at 158 or 162, the truck may return to a substantially straight heading, e.g., 0 degrees at 164 and the process loops back to the beginning to wait for the detection of another object in either of the steer bumper zones 132A, 132B.

The algorithm can further be modified to follow various control logic implementations and/or state machines to facilitate various anticipated circumstances. For example, it is possible that a second object will move into either steer bumper zone 132A or 132B while in the process of implementing a steer compensation maneuver. In this regard, the truck 10 may iteratively attempt to steer correct around the second object. As another illustrative example, if object(s) are simultaneously detected in both the left and right steer bumper zones 132A, 132B, the controller 103 may be programmed to maintain the truck 10 at its current heading (e.g., zero degree steer angle), until either one or more steer bumper zones 132A, 132B are cleared or the associated detection zones cause the truck 10 to come to a stop.

According to further aspects of the present invention, a user and/or service representative may be able to customize the response of the steer angle correction algorithm parameters. For example, a service representative may have access to programming tools to load customized variables, e.g., in the controller 103, for implementing steer correction. As an alternative, a truck operator may have controls that allow the operator to input customized parameters into the controller, e.g., via potentiometers, encoders, a software user interface, etc.

The output of the algorithm illustrated in FIG. 11 may comprise, for example, an output that defines a steer correction value that may be coupled from the controller 103 to an appropriate control mechanism of the truck 10. For example, the steer correction value may comprise a +/−steer correction value, e.g., corresponding to steer left or steer right, that is coupled to a vehicle control module, steer controller 112, e.g., as illustrated in FIG. 2, or other suitable controller. Still further, additional parameters that may be editable, e.g., to adjust operational feel may comprise the steer correction angle, a steer correction angle ramp rate, a bumper detection zone size/range for each steer bumper zone, truck speed while steer correcting, etc.

Referring to FIG. 12, assume in the illustrative example, that the truck 10 is traveling in response to receiving a remote wireless travel request and that before the truck 10 can travel a predetermined jog distance, the truck 10 travels into a position where a rack leg 172 and a corresponding pallet 174 are in the path of the left steer bumper zone 132A. Keeping with the exemplary algorithm of FIG. 11, the truck 10, e.g., via the controller 103, may implement an obstacle avoidance maneuver by entering a steer correction algorithm, to steer the truck to the right. For example, the controller 103 may compute or otherwise lookup or retrieve a steer correction angle that is communicated to a steer controller 112 to turn the drive wheel(s) of the truck 10.

The truck 10 maintains steer correction until an event occurs, such as the disengagement of the object, e.g., when the scanning laser or other implemented sensor technology no longer detects an object in the left steer bumper zone 132. Assume that the truck 10 accumulated a travel distance of one half of a meter during the steer correction maneuver, which was fixed at 8 degrees. Upon detecting that the left steer bumper zone signal has disengaged, a counter steer compensation is implemented to compensate for the change in heading caused by the steer correction. By way of example the steer compensation may steer the truck 10 to the left for approximately one quarter meter accumulated travel distance, at 4 degrees. For very narrow aisles, the Left/Right steer bumper zone sensors may provide very frequent inputs/little time between senses compared to relatively wider aisles.

The various steer angle corrections and corresponding counter steer compensations may be determined empirically, or the angles, ramp rates, accumulated distances, etc., may be computed, modeled or otherwise derived.

In the illustrative arrangement, the system will try to maintain the truck 10 centered in the aisle as the truck 10 advances in response to receiving a corresponding wirelessly transmitted travel request by the transmitter 70. Moreover, bounce, e.g., as measured by the distance from the centerline of a warehouse aisle, is damped. Still further, there may be certain conditions where the truck 10 may still require some operator intervention in order to maneuver around certain objects in the line of travel.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A materials handling vehicle capable of supplemental remote control comprising:
   a power unit for driving the vehicle;
   a load handling assembly;
   a receiver at the vehicle for receiving transmissions from a corresponding remote control device, the transmissions comprising at least a first type signal designating a travel request requesting the vehicle to travel;
   at least one contactless obstacle sensor on the vehicle operable to scan at least two speed zones, each speed zone being defined in an area at least partially in front of a forward traveling direction of the vehicle and being associated with a unique predetermined maximum speed greater than zero (0) miles per hour; and
   a controller that communicates with the receiver and with a traction control system of the vehicle to operate the vehicle under remote control in response to receiving travel requests from the remote control device, wherein the controller receives information obtained from the at least one obstacle sensor and, if the vehicle is traveling under remote control in response to a travel request from the remote control device, the controller is configured to limit the vehicle speed to the predetermined maximum speed of a corresponding one of the at least two speed zones based upon the detection of an obstacle in that speed zone.

2. The materials handling vehicle according to claim 1, wherein:
   the at least one obstacle sensor further scans a stop zone; and
   if the vehicle is traveling under remote control in response to a travel request from the remote control device, the controller is configured to implement a stop action to stop the vehicle if an obstacle is detected in the stop zone.

3. The materials handling vehicle according to claim 2, wherein:
   the controller is further configured to refuse to operate the vehicle under remote control in response to receipt of a travel request received from the remote control device if an obstacle is detected within the stop zone before the vehicle begins travel.

4. The materials handling vehicle according to claim 1, wherein:
   the predetermined speed associated with the first one of the at least two speed zones comprises a first predetermined speed; and
   the controller is further configured to accelerate the vehicle to a predetermined maximum speed that is greater than the first predetermined speed if the vehicle is traveling under remote control in response to a travel request from the remote control device and no obstacle is detected in the first speed zone.

5. The materials handling vehicle according to claim 1, wherein:
   the controller is further configured to modify at least one vehicle parameter other than speed in response to the detection of an obstacle in at least one detection zone.

6. The materials handling vehicle according to claim 5, wherein:
   the controller further communicates with a steer controller of the vehicle;
   the at least one obstacle sensor further scans at least one steer angle correction zone; and
   if the vehicle is traveling under remote control in response to a travel request from the remote control device, the controller is further configured to implement a steer angle correction if an obstacle is detected in a corresponding steer angle correction zone.

7. The materials handling vehicle according to claim 6, wherein the controller is further configured to select a direction of steer angle adjustment based upon a determination of a position of a detected obstacle.

8. The materials handling vehicle according to claim 6, wherein:
   the at least one steer angle correction zone comprises a plurality of different steer angle correction zones; and
   the controller is further configured to implement a different steer angle correction amount for each steer angle correction zone.

9. The materials handling vehicle according to claim 6, wherein a steer correction angle ramp rate is editable.

10. The materials handling vehicle according to claim 1, further comprising at least one presence sensor for detecting whether an operator is positioned on the vehicle, wherein the controller is further configured to operate the vehicle under remote control only when the at least one presence sensor designates that no operator is on the vehicle.

11. The materials handling vehicle according to claim 1, wherein:
   the predetermined speed associated with the first one of the at least two speed zones comprises a first predetermined speed;
   the predetermined speed associated with the second one of the at least two speed zones comprises a second predetermined speed;
   the second speed zone is located further from the vehicle than is the first speed zone; and
   the second predetermined speed is greater than the first predetermined speed.

12. A multiple detection zone system for a materials handling vehicle comprising:
   at least one contactless obstacle sensor for mounting on the vehicle, the at least one obstacle sensor operable to scan at least two speed zones, each speed zone being defined in an area at least partially in front of a forward traveling direction of the vehicle and being associated with a unique predetermined maximum speed greater than zero (0) miles per hour; and wherein:

if the vehicle is traveling under remote control, a controller on the vehicle is configured to limit the vehicle speed to the predetermined maximum speed of a corresponding one of the at least two speed zones based upon the detection of an obstacle in that speed zone.

13. The multiple detection zone system for a materials handling vehicle according to claim 12, wherein:

the at least one obstacle sensor further scans a stop zone; and if the vehicle is traveling under remote control, the controller is further configured to implement a stop action to stop the vehicle if an obstacle is detected in the stop zone.

14. The multiple detection zone system for a materials handling vehicle according to claim 13, wherein:

the controller is further configured to refuse to operate the vehicle under remote control if an obstacle is detected within the stop zone before the vehicle begins travel.

15. The multiple detection zone system for a materials handling vehicle according to claim 12, wherein:

the predetermined speed associated with the first one of the at least two speed zones comprises a first predetermined speed; and the controller is further configured to accelerate the vehicle to a predetermined maximum speed that is greater than the first predetermined speed if the vehicle is traveling under remote control and no obstacle is detected in the first speed zone.

16. The multiple detection zone system for a materials handling vehicle according to claim 12, wherein:

the controller is further configured to modify at least one vehicle parameter other than speed in response to the detection of an obstacle in at least one detection zone.

17. The multiple detection zone system for a materials handling vehicle according to claim 16, wherein:

the controller further communicates with a steer controller of the vehicle;

the at least one contactless obstacle sensor further scans at least one steer angle correction zone; and if the vehicle is traveling under remote control, the controller is further configured to implement a steer angle correction if an obstacle is detected in a corresponding steer angle correction zone.

18. The multiple detection zone system for a materials handling vehicle according to claim 17, wherein the controller is further configured to select a direction of steer angle adjustment based upon a determination of a position of a detected obstacle.

19. The multiple detection zone system for a materials handling vehicle according to claim 17, wherein:

the at least one steer angle correction zone comprises a plurality of different steer angle correction zones; and the controller is further configured to implement a different steer angle correction amount for each steer angle correction zone.

20. The multiple detection zone system for a materials handling vehicle according to claim 17, wherein a steer correction angle ramp rate is editable.

21. The multiple detection zone system for a materials handling vehicle according to claim 12, further comprising at least one presence sensor for detecting whether an operator is positioned on the vehicle, wherein the controller is further configured to operate the vehicle under remote control only when the at least one presence sensor designates that no operator is on the vehicle.

22. The multiple detection zone system for a materials handling vehicle according to claim 12, wherein:

the predetermined speed associated with the first one of the at least two speed zones comprises a first predetermined speed;

the predetermined speed associated with the second one of the at least two speed zones comprises a second predetermined speed;

the second speed zone is located further from the vehicle than is the first speed zone; and the second predetermined speed is greater than the first predetermined speed.

23. The multiple detection zone system for a materials handling vehicle according to claim 12, wherein the vehicle is remotely controlled via a wireless remote control device.

24. A method for operating a materials handling vehicle utilizing multiple detection zones comprising:

defining a first speed zone in an area at least partially in front of a forward traveling direction of the vehicle, the first speed zone being associated with a first predetermined maximum speed greater than zero (0) miles per hour;

defining a second speed zone in an area at least partially in front of the forward traveling direction of the vehicle, the second speed zone being associated with a second predetermined maximum speed greater than zero (0) miles per hour and different than the first predetermined maximum speed;

if the vehicle is traveling in response to the receipt of a remote travel request and an obstacle is detected in the first speed zone, limiting the speed of the vehicle to the first predetermined maximum speed; and if the vehicle is traveling in response to the receipt of a remote travel request and an obstacle is detected in the second speed zone, limiting the speed of the vehicle to the second predetermined maximum speed.

25. The method according to claim 24, wherein the first and second speed zones are scanned by at least one contactless obstacle sensor on the vehicle.

26. The method according to claim 24 further comprising:

defining a stop zone; and if the vehicle is traveling in response to the receipt of a remote travel request and an obstacle is detected in the stop zone, implementing a stop action to stop the vehicle.

27. The method according to claim 26, further comprising preventing operation of the vehicle if an obstacle is detected within the stop zone before the vehicle begins travel.

28. The method according to claim 24, further comprising, if the vehicle is traveling in response to the receipt of a remote travel request, modifying at least one vehicle parameter other than speed in response to the detection of an obstacle in at least one detection zone.

29. The method according to claim 28, wherein:

the at least one detection zone comprises a steer angle correction zone; and modifying at least one vehicle parameter other than speed comprises implementing a steer angle correction.

30. The method according to claim 29, wherein implementing a steer angle correction further comprises selecting a direction of steer angle adjustment based upon a determination of a position of a detected obstacle.

31. The method according to claim 28, wherein:
the at least one detection zone comprises a plurality of different steer angle correction zones; and
modifying at least one vehicle parameter other than speed comprises implementing a different steer angle correction amount for each steer angle correction zone.

32. The method according to claim 28, wherein a steer correction angle ramp rate is editable.

33. The method according to claim 24, further comprising, if the vehicle is traveling in response to the receipt of a remote travel request, accelerating the vehicle to a predetermined maximum speed that is greater than the first predetermined speed if no obstacle is detected in the first speed zone.

34. The method according to claim 24, further comprising detecting whether an operator is positioned on the vehicle, wherein the controller is further configured to operate the vehicle under remote control only when the at least one presence sensor designates that no operator is on the vehicle.

35. The method according to claim 24, wherein the second speed zone is located further from the vehicle than is the first speed zone and the second predetermined speed is greater than the first predetermined speed.

36. The method according to claim 24, wherein the vehicle is remotely controlled via a wireless remote control device.

* * * * *